(12) United States Patent
Kumagai

(10) Patent No.: US 6,203,748 B1
(45) Date of Patent: Mar. 20, 2001

(54) TIRE CONFIGURATION CONTROL METHOD, HOLDING APPARATUS FOR POST CURE INFLATION, AND POST CURE INFLATION APPARATUS

(75) Inventor: Moriyasu Kumagai, Toyko (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/108,173

(22) Filed: Jul. 1, 1998

(30) Foreign Application Priority Data

Jul. 3, 1997 (JP) .................................................. 9-178193
Sep. 8, 1997 (JP) .................................................. 9-242472

(51) Int. Cl.[7] ................................................ B29D 30/06
(52) U.S. Cl. ........................................ 264/502; 425/58.1
(58) Field of Search .................................. 264/501, 502, 264/237, 348; 425/58.1

(56) References Cited

U.S. PATENT DOCUMENTS 3,120,571    2/1964   Wolfer .
3,214,791 *  11/1965  Ericson et al. ...................... 425/58.1
3,529,048    9/1970   Kovac et al. .
5,365,781    11/1994  Rhyne .

FOREIGN PATENT DOCUMENTS 17 29 614    6/1971   (DE) .
988 081      12/1962  (GB) .
3-153319     7/1991   (JP) .
6-507858     9/1994   (JP) .

* cited by examiner

*Primary Examiner*—Mathieu D. Vargot
(74) *Attorney, Agent, or Firm*—Sughrue, Mion, Zinn, Macpeak & Seas, PLLC

(57) ABSTRACT

A post cure inflation is carried out in a state in which the position of a tire which corresponds to the peak portion of the measured radial runout of the tire whose internal portion is in a high temperature state after vulcanization is restrained or in a state in which the position between bead portions of the tire, which corresponds to the peak portion of the measured radial runout of the tire whose internal portion is in a high temperature state after vulcanization is held at a minimum width. As a result, the tire after vulcanization can be formed in an appropriate configuration.

10 Claims, 13 Drawing Sheets

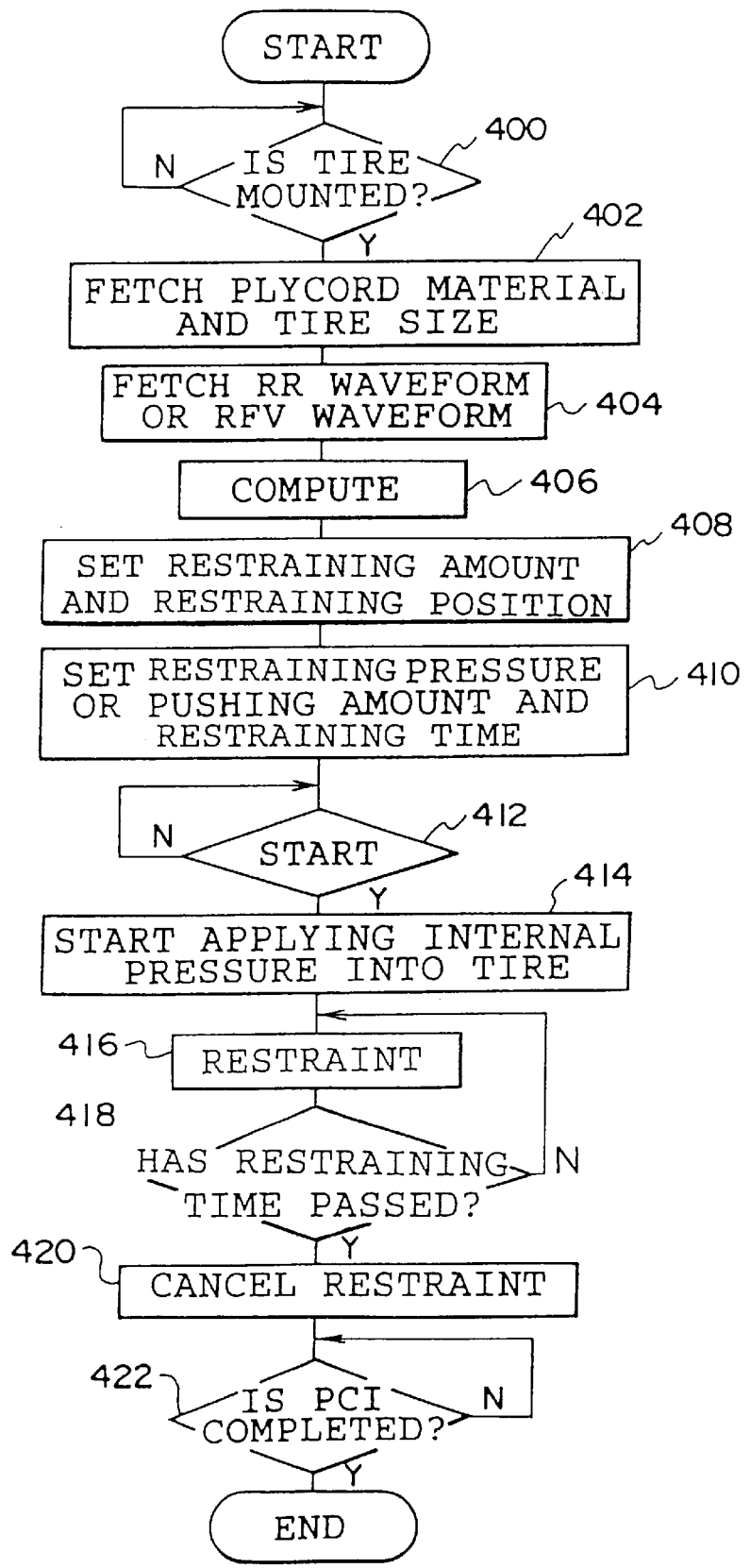

TIRE CONFIGURATION CONTROL METHOD, HOLDING APPARATUS FOR POST CURE INFLATION, AND POST CURE INFLATION APPARATUS

BACKGROUND OF THE INVENTION

1. Field of the Invention

The present invention relates to a tire configuration control method, a holding apparatus for post cure inflation, and a post cure inflation apparatus.

2. Description of the Related Art

The uniformity characteristics of a tire are determined by a force variation in a radial direction of the tire (i.e., a weighing direction of the tire) (RFV: Radial Force Variation), a force variation in a lateral direction of the tire (LFV: Lateral Force Variation), and a force variation in a tangential direction of the tire (TFV: Tangential Force Variation). RFV, LFV, and TFV each having lower values are evaluated to be able to maintain superior uniformity characteristics. Further, since excessive force is generated at a circumferential portion which protrudes outwardly from the tire, RFV of uniformity characteristics is correlated with such ununiformity of size that may occur in the radial direction of the tire (RR: radial runout).

Conventionally, in order to correct uniformity characteristics of a tire by increasing RFV, the reducing of RR of the tire has been carried out.

In order to reduce RR of a tire, a method in which the aforementioned protruding portion of the tire is abraded is employed. As an apparatus for which this method has been applied, for example, a post cure inflation apparatus (i.e., a post cure inflator which is referred to as PCI, hereinafter) has been proposed in which the outer diameter of a tire is measured by a tire diameter sensor, and a portion having a larger outer diameter of the tire is abraded by an outer diameter buffing apparatus, during the steps after vulcanization (Post Cure Inflation which is referred to as PCI, hereinafter) in which a tire after vulcanization (post cure) is maintained constant so as to stabilize the configuration of the tire (Japanese Patent Application Laid-Open (JP-A) No. 3-153319).

Further, there is also provided a method in which uniformity characteristics can be improved not by abrading a tire but by deforming permanently a carcass reinforcing member of a tire after vulcanization at an ordinary temperature (Japanese Patent application Laid-open (JP-A) No. 6-507858). As an apparatus to which this method has been applied, an apparatus in which a tire product is previously tested for its uniformity characteristics, and a portion of the tire at which uniformity characteristics are needed to be controlled is specified, and a relatively high inflation pressure is applied to the tire for a predetermined period of time in a state in which this portion is restrained by a restraining ring. By this apparatus, the tire is inflated until it has the pressure which is equal to or greater than a recommended operational pressure of the tire, the portion of the carcass reinforcing member is pulled, and permanent elongation is thereby generated so that uniformity characteristics of the tire can be improved.

However, in the above-described method in which a tire is abraded, the appearance/the quality of the tire may deteriorate by abrasion. Further, there arises a problem in that dust is caused by abrade so that workshops may be polluted. Moreover, in the method in which a portion of the carcass reinforcing member is deformed permanently without abrading the tire, there may be a case in which the pressure needed for generating permanent deformation on a portion of the carcass reinforcing member is extremely large due to the type/the physical properties of the carcass reinforcing member(s). As a result, due to such excessive pressure, a tire may be broken.

SUMMARY OF THE INVENTION

In view of the aforementioned facts, it is an object of the present invention to provide a tire configuration control method, a holding apparatus for PCI, and a PCI apparatus by which uniformity characteristics of a tire can be improved more effectively without causing a damage to the appearance of the tire and without demolition of the tire.

The first aspect of the present invention is a tire configuration control method which controls the configuration of a tire after vulcanization, comprising: the steps of restraining at least a portion of the area which extends from the side surfaces of the tire whose internal portion is in a high temperature state after vulcanization; and carrying out post cure inflation in state in which the tire is restrained.

In accordance with the present invention, during PCI, a portion or the entire circumferential portion, of the tire, which extends from the side surfaces to the circumferential surface thereof is restrained, and the current configuration is maintained. The carcass cord member is disposed in a toroidal state between the bead portions so as to extend from the side surfaces to the circumferential surface thereof. During PCI, the length of the cord member between the bead portions is controlled by this restraint. Because the configuration of the tire in a radial direction thereof depends on the length of the cord member, the elongation of the cord member at the restrained portion of the tire is controlled and the length of the cord member is thereby controlled. Accordingly, the tire configuration after PCI can be controlled appropriately.

This arises from the physical properties of the carcass cord member which may vary as the temperature of the tire changes during PCI. As an example, the relationship between a heat shrinkage (contraction) percentage and a tensile test elongation, and the relationship between the tensile test elongation and the temperature, of a polyester cord are shown respectively in FIG. 9A and 9B. By controlling the internal pressure, the temperature, and the restraining time, of the tire, it is possible to change the physical properties of the cord from point A to point B in FIG. 9. As shown in FIG. 9B, it should be understood from a standpoint that the heating temperature for a tire is changed by maintaining the internal pressure and the restraining time constant so that the tensile test elongation can be changed. Namely, it is possible to vary the length of the cord at an ordinary temperature by changing the physical properties of the tire from point A to point B in FIG. 9A.

Because there is neither abrasion of the tire nor the application of a large amount of pressure into the tire, the tire configuration can be controlled more effectively without causing damage to the appearance of the tire and without the demolition of the tire so that uniformity characteristics of the tire can be corrected.

In the present invention, at least one of the restraining position, the restraining pressure, the restraining time, and the pushing amount at the restraining position of the tire are determined as restraining conditions on the basis of configuration characteristics of a tire before vulcanization or configuration characteristics of a tire after vulcanization.

If restraining conditions are determined on the basis of the aforementioned configuration characteristics of the tire, the manufacturing of another tire is not needed for determining the restraining conditions. Accordingly, it is possible to manufacture a tire whose configuration can be controlled more effectively.

The restraining position of the tire can correspond to the peak position of the measured RR.

If a tire is restrained at the peak position of the measured RR which is highly correlated to RR and RFV of a tire product, equalization of RR and RFV of the finished tire is thereby facilitated. RR may be measured in a tire before vulcanization, or may be measured in a tire product after vulcanization. In the case in which RR of a tire is measured before vulcanization it is possible to directly specify the restraining position of the tire, and the configuration of the tire can be controlled more reliably.

In the waveform resulted from the measuring of RR of the tire, because the position of the peak and the magnitude of the peak are expressed, the peak position of the waveform can be set as the restraining position, and the restraining pressure and the pushing amount can be specified from the magnitude of the peak portion.

In accordance with the first aspect of the present invention, it is possible to control the elongation of the cord members of the carcass at the restraining position of the tire.

Because the elongation of the carcass cord member disposed between the bead portions in a toroidal state can be controlled at the restraining position of the tire, the length of each of the carcass cord members which are disposed between the bead portions can be controlled, the size of the tire in the radial direction thereof can be uniformed, and the control of the configuration of the tire is thereby facilitated.

The second aspect of the present invention is a post cure inflation apparatus which holds a tire whose internal portion is in a high temperature state after vulcanization until the tire has a predetermined temperature, comprising: internal pressure applying means for applying the internal pressure into the tire which has been restrained; restraining means for restraining at least a portion of the area which extends from the side surfaces to the circumferential surface of the tire; restraining conditions setting means for setting at least one of the restraining position, the restraining pressure, the restraining time and the pushing amount of the tire at the restraining position as restraining conditions, on the basis of configuration characteristics of a tire before vulcanization or configuration characteristics of a tire after vulcanization; and control means for controlling the internal pressure applying means and the restraining means on the basis of the restraining conditions set by the restraining conditions setting means.

In accordance with the second aspect of the present invention, since the PCI apparatus has the restraining means, while effecting PCI process on the tire whose internal portion is in a high temperature state after vulcanization, the tire can be restrained under the predetermined restraining conditions Therefore, the elongation of each of the carcass cord members of the tire can be controlled by using the temperature and the energy generated from the tire during the PCI process so that the configuration of the tire can be controlled more effectively. As a result, uniformity characteristics of the tire can be corrected more effectively without causing a damage to the appearance of the tire and without demolition of the tire.

As described above, in accordance with the first and second aspects of the present invention, during PCI, at least a portion of the tire whose internal portion is in a high temperature state after vulcanization extending from the side surfaces to the circumferential surface thereof is restrained for a predetermined period of time, and the length of each of the cord members is thereby controlled. Accordingly, uniformity characteristics of the tire can be corrected more effectively without causing a damage to the appearance of the tire and without demolition of the tire.

In accordance with the third aspect of the present invention, there is provided a tire configuration control method which controls the configuration of a tire after vulcanization, comprising the steps of: holding the width between the bead portions of the tire whose internal portion is in a high temperature state after vulcanization so as to correspond to the holding width which is defined on the basis of the configuration characteristics of the tire before vulcanization or the configuration characteristics of the tire after vulcanization; and effecting a post cure inflation in a state in which the tire is held.

In accordance with the third aspect of the present invention, during PCI, because the portion between the bead portions of the tire is held at the holding width which may vary in the circumferential direction of the tire on the basis of the aforementioned configuration characteristics of the tire. In this tire, the carcass cord members each of which is disposed in a toroidal state so as to extend between the bead portions. During PCI, the cord member each of which is disposed in a direction intersecting the circumferential direction of the tire elongates so that the length of each of the cord members varies as the temperature changes. Because the configuration of the tire in the radial direction thereof depends on the length of each of the cord member, on the basis of the configuration characteristics of the tire defined by the length of each of the cord members, during PCI, the portion between the bead portions of the tire is held at the holding width which may vary in the circumferential direction of the tire. Accordingly, the elongation of each of the cord members between the bead portions during PCI process is caused to vary so as to control the length of each of the cord members. As a result it is possible to control the configuration of the tire after PCI process in a direction in which the tire deforms.

As shown in FIGS. 9A and 9B, the physical properties of the carcass cord members may vary as the temperature changes during PCI.

Accordingly, since neither the abrasion of the tire nor the application of a large amount of pressure into the tire is needed, the tire configuration can be controlled more effectively without causing a damage to the appearance of the tire and without demolition of the tire so that uniformity characteristics can be improved.

In accordance with the third aspect of the present invention, at least one of the positional relationship between the tire, the holding width which may vary in the circumferential direction of the tire, the difference between a maximum value and a minimum value of the holding width, and the holding time can be determined as restraining conditions on the basis of the aforementioned configuration characteristics of the tire.

Since the restraining conditions are determined on the basis of the configuration characteristics of the tire, another tire is not needed to be manufactured in order to determine the restraining conditions. As a result, a tire whose configuration has been controlled more effectively can be manufactured.

In accordance with the third aspect of the present invention, it is preferable that the position of the tire corresponding to the peak position of the measured RR thereof is held at a minimum holding width.

If the position of the tire corresponding to the peak position of the measured RR which is highly correlated with RR and RFV of a tire product is held at a minimum width, the elongation of each of the cord members at the peak portion of the measured RR which corresponds to the position of the tire where a portion of the cord members is relatively longer can be minimized. Accordingly, the difference among the lengths of the cord members after PCI can be minimized. As a result, the tire whose configuration is much closer to a perfect roundness can be manufactured.

In the same manner as the above-description, the position of the tire which corresponds to the bottom position of the measured RR of the tire can be held at a maximum width. In this case, in a tire before vulcanization, because the position of the tire at which a portion of the cord members is the shortest is held as the position of the tire where the holding width is the largest, it is possible to maximize the elongation of the cord members at the position of the tire which corresponds to the position at which the cord members are relatively shorter. As a result, in the similar manner to the above-description, the tire whose configuration is much closer to a perfect roundness can be manufactured.

Moreover, the position of the tire which corresponds to the measured peak position of the measured RR of the tire can be held at a minimum holding width. The position of the tire which corresponds to the bottom position of the measured RR of the tire is held at a maximum holding width. In this case, the shortest cord member elongates at maximum, while the longest cord member elongates at minimum. As a result, a tire whose configuration is much closer to a perfect roundness can be manufactured more effectively.

The third aspect of the present invention is a tire configuration control method in which the portion between the bead portions of the tire can be held by an annular shaped holding apparatus whose size in an axial direction of the tire varies in the circumferential direction thereof on the basis of the configuration characteristics of the tire. Since the portion between the bead portions of the tire is held by such holding apparatus as described above, the portion between the bead portions of the tire is held at various holding widths on the basis of the configuration characteristics of the tire. As a result, the PCI process and the control of the configuration of the tire can be effected at the same time in a simple manner.

The holding apparatus is formed by a main body which is formed in an annular shape and has a number of air holes punched at the circumferential surface of the main body, the distance between the circumferential end portions of the main body having a size a corresponds to the thickness of a tire whose internal portion is in a high temperature state after vulcanization; and a pair of holding portions which protrude outwardly from the circumferential end portions of the main body, the distance between the pair of the holding portions varying in the circumferential direction of the main body on the basis of the configuration characteristics of the tire before vulcanization or the configuration characteristics of the tire after vulcanization.

In this holding apparatus, when the holding apparatus holds the fire, because the distance between the pair of the holding portions varies in the circumferential surface of the main body, the distance between the bead portions of the tire can be held at various widths. Accordingly, during the PCI process, the elongation of the cord members between the bead portions of the tire during the PCI process can be controlled at the holding width. Therefore, the elongation of the cord members can be controlled in the circumferential direction of the tire on the basis of the configuration characteristics of the tire. As a result, it can be ensured that the PCI process can be effected by holding the position of the tire during PCI, and the length of each of the cord members which are disposed between the bead portions can be controlled. The PCI process and the control of the lengths of the cord members can be effected at one time without causing a damage to the appearance of the tire and without demolition of the tire. As a result, more effective correction of the uniformity characteristics of the tire can be carried out.

There is provided a post cure inflation apparatus which effects the third aspect of the present invention, and which holds a tire after vulcanization until the tire has a predetermined temperature, comprising: internal pressure applying means for applying an internal pressure into the tire which has been held; a holding apparatus which includes: a main body which is formed in an annular shape and has a number of air holes formed at the circumferential surface thereof, the distance between the circumferential end portions of the main body having a size which corresponds to the thickness of the tire after vulcanization; and a pair of holding portions which protrude outwardly from the circumferential end portions of the main body, the distance between the pair of the holding portions varying in the circumferential direction of the main body on the basis of configuration characteristics of the tire before vulcanization or configuration characteristics of the tire after vulcanization, in which holding apparatus, the portion between the bead portions of the tire is held at the holding width in accordance with the configuration characteristics of the tire; holding conditions setting means for setting at least one of the positional relationship between the tire and the holding width, the difference between a maximum value and a minimum value of the holding width, and the holding time as holding conditions on the basis of configuration characteristics of the tire before vulcanization or configuration characteristics of the tire after vulcanization; and control means which controls the internal pressure applying means on the basis of the holding conditions set by the holding conditions setting means.

In the post cure inflation apparatus, the holding apparatus has a pair of holding portions which protrude from the circumferential surface of the main body and are separated from each other at the width which is set on the basis of the configuration characteristics of the tire. The distance between the bead portions of the tire is held by this holding apparatus at the holding width on the basis of the configuration characteristics of the tire. Accordingly, during the PCI process which is carried out by applying the internal pressure into the tire by the internal pressure applying means, the tire is held reliably, and in the same manner as described above, the elongation of the cord members at the bead portions of the tire can be controlled in the circumferential direction of the tire. As a result, the elongation of the length of each of the carcass cord members of the tire can be controlled, and the tire. configuration can be adjusted more effectively.

Accordingly, uniformity characteristics of the tire can be modified without causing a damage to the appearance of the tire and with demolition of the tire.

As described above, in accordance with the third aspect of the present invention, during PCI, because the distance between the bead portions of the tire is held at the holding width which may vary in the circumferential direction of the tire on the basis of the configuration characteristics of the tire. As a result, because the elongation of the cord member is controlled in accordance with the configuration characteristics of the tire, uniformity characteristics of the tire can be corrected more effectively.

The present invention can be carried out during the PCI process immediately after vulcanization, and, as needed, can also be carried out during another PCI process in which the tire is again heated thereafter. In accordance with the present invention, because RR or the like of the tire after vulcanization is estimated on the basis of RR of the green tire before vulcanization, even if the tire configuration is adjusted during the PCI process immediately after vulcanization, the tire may not pass an inspection which will be carried out later (i. e., a tire having a level value which exceeds the estimated value may be generated). In such a case, the tire is heated again, another PCI process is carried out again, and the tire configuration is corrected by the same means as in the first PCI process. Even in this latter case, similar effects can be obtained.

Herein, "immediately after vulcanization" means, for example, between about 0 and 10 minutes after vulcanization. The temperature for heating the tire again is preferably greater than or equal to 80° C. which is the same as the tire immediately after vulcanization, and more preferably, 120° C. to 180° C.

BRIEF DESCRIPTION OF THE DRAWINGS

FIG. 13 is a flowchart which illustrates a PCI process and a restraining process by the PCI apparatus according to the second embodiment of the present invention.

DESCRIPTION OF THE PREFERRED EMBODIMENTS

With reference to the accompanying drawings, a detailed description of the present embodiment will be given hereinafter.

Figure 1:
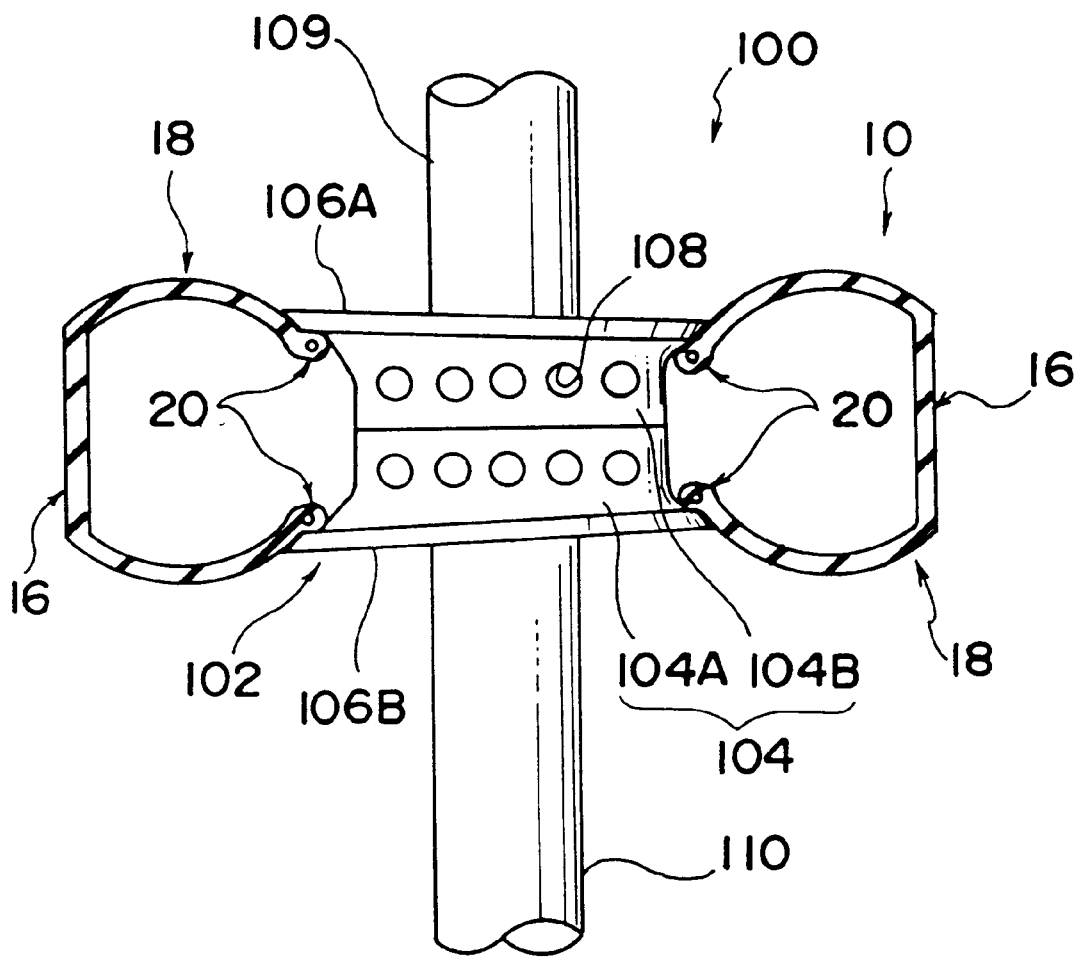
FIG. 1 is a schematic side view of a PCI apparatus according to a first embodiment of the present invention.

FIG. 1 shows a PCI apparatus 100 according to a first embodiment of the present invention. A radial tire 10 (which is simply referred to as a tire, hereinafter) immediately after vulcanization is mounted to the PCI apparatus 100. Further, a cross sectional view of the tire 10 is shown in FIG. 1.

Figure 2:
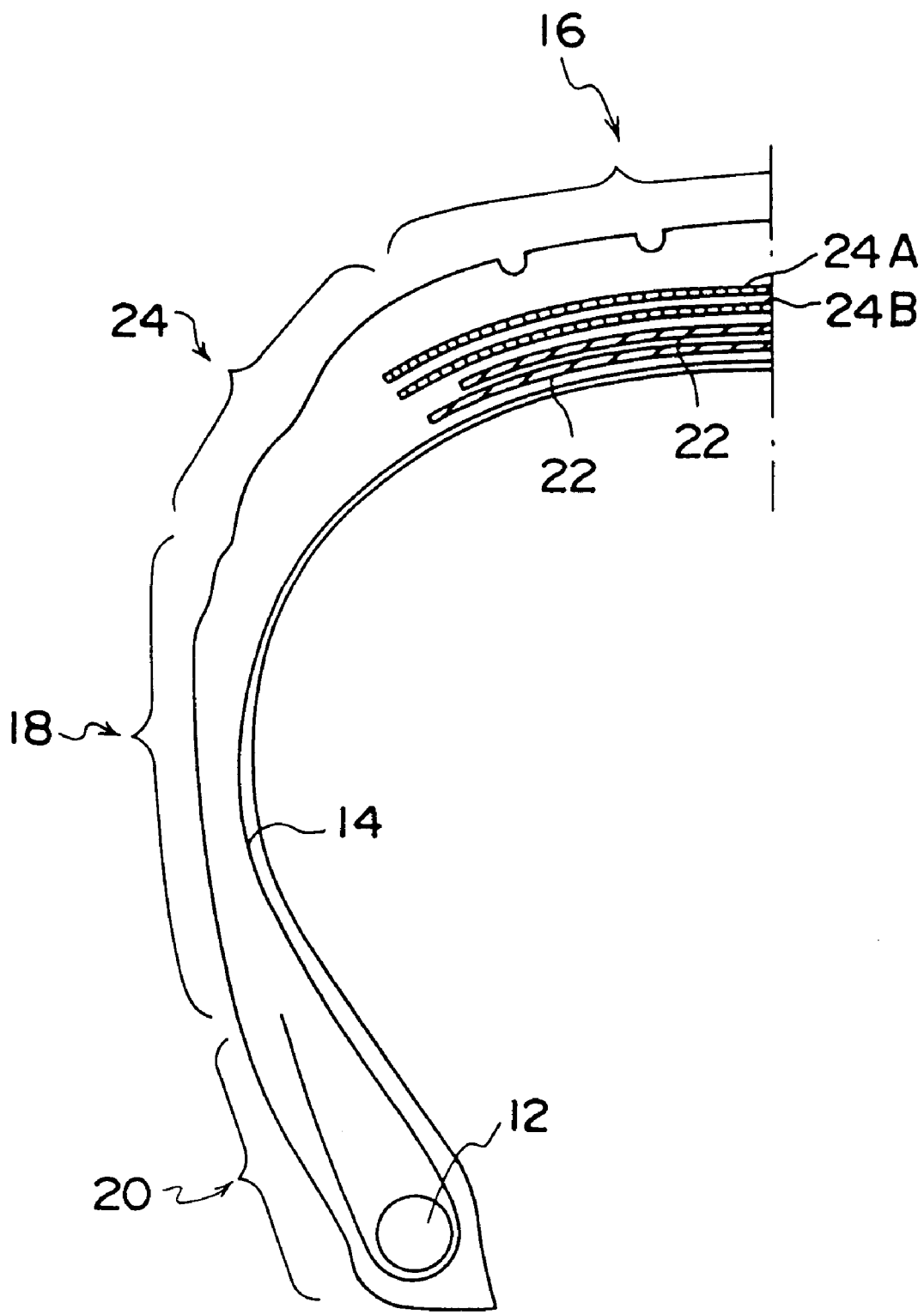
FIG. 2 is a cross sectional view of a tire which can be mounted to the PCI apparatus according to the present embodiment.

As shown in FIG. 2, the tire which is mounted to the PCI apparatus 100, has a carcass 14 which is turned up around each of bead cores 12 from inside to outside of the tire and is engaged with each of the bead cores 12. The carcass 14 is formed by at least one layer which is formed by ply cords which are made from fiber cords such as polyester cords, being lined up substantially in a direction orthogonal to the circumferential direction of the tire.

Further, the tire 10 is structured by a tread portion 16 which is disposed at the crown portion of the carcass 14, side wall portions 18 of the carcass 14, shoulder portions 24 between the tread portion 16 and each of the side wall portions 18, and bead portions 20 which are disposed around the bead cores 12, respectively, and which are provided at the central portion of the tire in the diametrical direction thereof.

The tread portion 16 includes at least two belt layers 22 which are disposed inside of the tire 10 in different directions, and at least one belt reinforcement layer 24A (and 24B) which are disposed at the outer circumferential side of the outermost belt layer 22 of the belt layers 22. At least two non-stretchable cords which are formed by a steel cord or the like are lined up at the angles of 10° to 30° with respect to a circumferential direction of the tire (or the equatorial plane of the tire) on the belt layers 22 so as to intersect in different directions.

As shown in FIG. 1, the PCI apparatus 100 has a rim 102 for holding the tire 10 immediately after vulcanization at the bead portions 20. The tire 10 is held by the rim 102 so that the diameter direction of the tire 10 is oriented in the horizontal direction of the PCI apparatus 10.

Figure 3A:
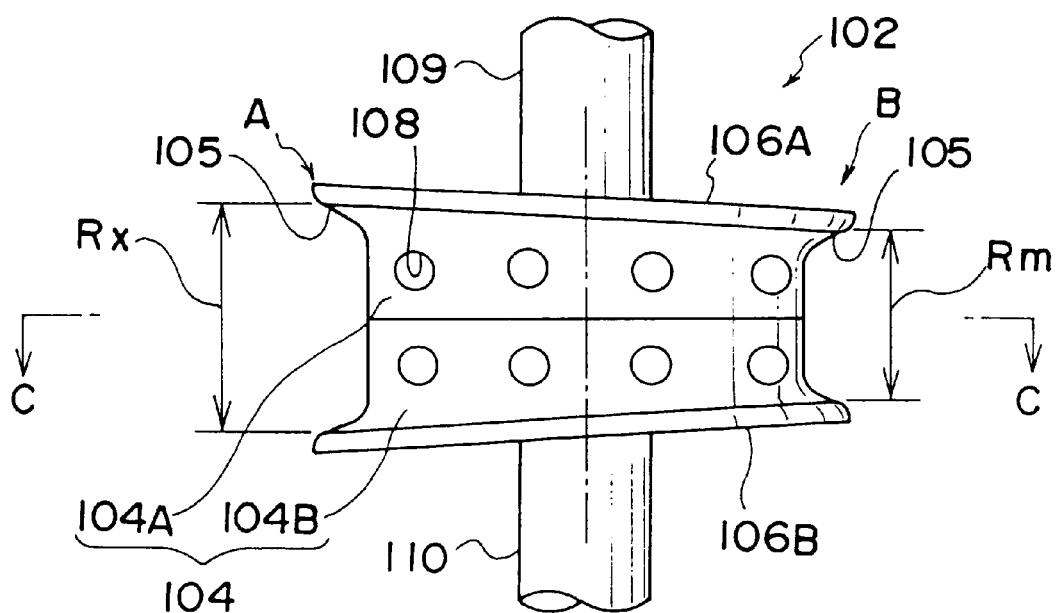
FIG. 3A is a side view of a rim according to the present embodiment.
Figure 3B:
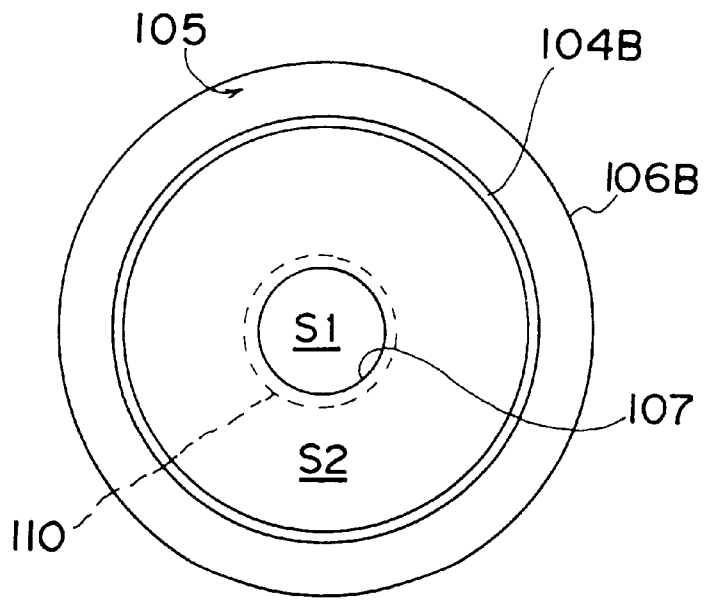
FIG. 3B is a cross sectional view taken along a line C—C in FIG. 3A.

As shown in FIG. 1 and FIGS. 3A and 3B, the rim 102 has a substantially cylindrical body 104 which is formed by a pair of cylinders 104A and 104B which are integrated with each other so as to be separable. A pair of holding discs 106A and 106B are mounted to the end portions of the cylinders 104A and 104B in the axial directions thereof, respectively (the upper end and the lower end in FIG. 1).

The holding disc 106A which is disposed axially at the upper side portion of the cylindrical body 104 (at the upper side of FIG. 1) is formed by a flat disc, and one end of a cylindrical supporting axis 109 is mounted to the axis core of the cylinder 104B. The holding disc 106B which is disposed axially at the lower side of the cylindrical body 104 (at the lower side of FIG. 1) is also formed by a flat disc in the same manner as the holding disc 106A. A circular connecting hole 107 is formed at the axial core portion of the holding disc 106B and is integrally connected to the central axis 110 of the rim 102.

As shown in FIG. 3A, the peripheral edge portions of the holding discs 106A and 106B project laterally from the main body 104, respectively so as to form a holding portion 105 which holds the bead portions 20 of the tire 10 in a direction in which they approach to each other.

The main body 104, which is formed by the cylinders 104A and 104B which are integrated with each other so as to be separable, has an axial width (which is referred to as a rim width hereinafter. See arrows $R_m$ and $R_x$ in FIG. 3A) which varies continuously along the circumferential direction of the main body 104. Therefore, the rim 102 has a position A (arrow $R_x$) whose rim width is a maximum value and a position B (arrow $R_m$) whose rim width is a minimum value. Because the rim width changes in such a manner as described above, the elongation of each of the ply cords at the bead portions 20 held by the holding discs 106A and 106B varies along the circumferential direction of the tire 10, and is thereby controlled.

Figure 4:
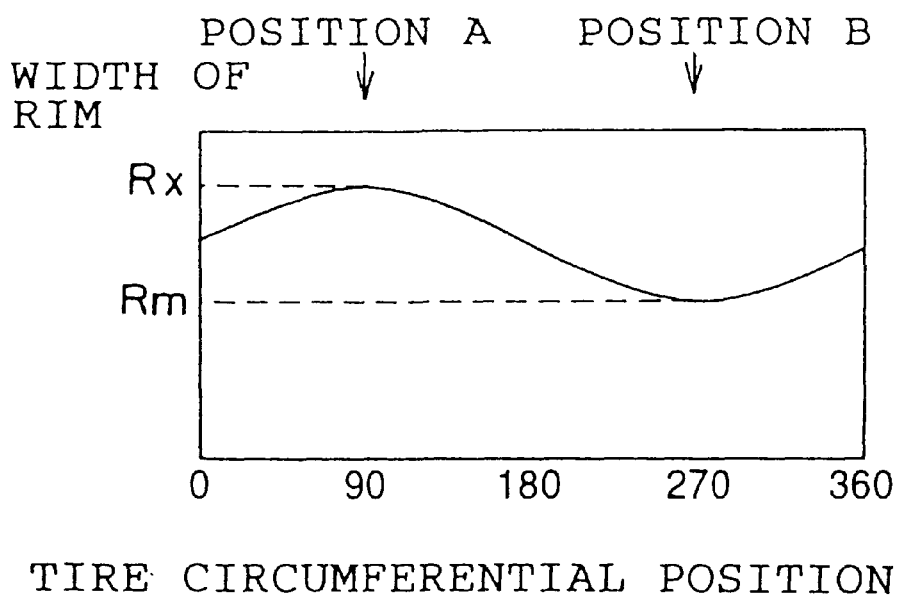
FIG. 4 is a graph which illustrates the change of the width of the rim according to the present embodiment.

As shown in FIG. 4, the positions A and B of the rim 102 are disposed so as to oppose each other, and the rim width between the positions A and B varies at the same variation ratio. The difference between a maximum value and a minimum value of the rim width varies in accordance with the size of the tire 10 which is subjected to a PCI process and the physical properties of the ply cords for forming the carcass 14. However, the difference between a maximum value and a minimum value of the rim width is generally from 0.5 to 15 mm. If the aforementioned difference is larger than 15 mm, each of the bead portions, and the tire itself deforms largely. In this case, it is not preferable because the elongation of the ply cords cannot be controlled effectively during the steps of the PCI process. If the difference is smaller than 0.5 mm, it is not preferable because it is difficult to obtain a substantial effect in which the elongation of the rim 102 can be controlled by changing the rim width. In order to control the configuration of a tire by effectively controlling the elongation of the ply cords during the PCI process, preferably, the difference is from 0.5 to 15 mm.

Further, the holding disc 106A and the holding disc 106B are inclined at the same angle with respect to the central line of the tire in the diametrical direction and in the directions opposing each other, of the tire. For this reason, the tire 10 held by the rim 102 can be maintained horizontal to the axis core of the main body 104.

The central axis 110 of the rim 102, which is connected to the holding disc 106B is formed by a hollow member. The internal space $S_1$ of the central axis 110 of the rim 102 is communicated to the space $S_2$ which is formed inside of the main body 104 of the rim 102. The other end of the central axis 110 of the rim 102 is connected to an internal pressure applying apparatus 112.

The internal pressure applying apparatus 112 has a compressor (not shown) which compresses the air and supplies the compressed air into the tire. The internal pressure which is applied to the tire 10 by the internal pressure applying apparatus 112 is substantially the same as the pressure used for the tire 10, or an ordinary PCI pressure. Further, the internal pressure applying apparatus 112 is provided with heating means which is not shown for heating the compressed air. The heated compressed air is supplied into the tire 10 and heats the internal portion of the tire 10 to a predetermined temperature. The temperature during the application of the internal pressure into the tire 10 is equal to or more than 80° C., and preferably, 120° C. to 180° C. When the temperature is equal to or less than 80° C., physical properties of the material used for the cords of the tire 10 do not vary easily. Therefore, it is not preferable from a stand point of controlling the physical properties of the cords of the tire.

The other end portion of the supporting axis 109 which is connected to the holding disc 106A is connected to a driving portion 114. The driving portion 114 includes driving means (not shown) such as a motor so as to move the holding disc 106B vertically. Accordingly, the cylinder 104A moves in the direction in which it approaches to the cylinder 104B or it separates from the cylinder 104B. When the cylinder 104A moves in the direction in which it approaches to the cylinder 104B, the cylinder 104A and the cylinder 104B are integrated with each other so as to form the rim 102. When the cylinder 104A moves in the direction in which it separates from the cylinder 104B, the cylinder 104A and the cylinder 104B, which have been integrated with each other so as to form the rim 102, are separated from each other.

Figure 5:
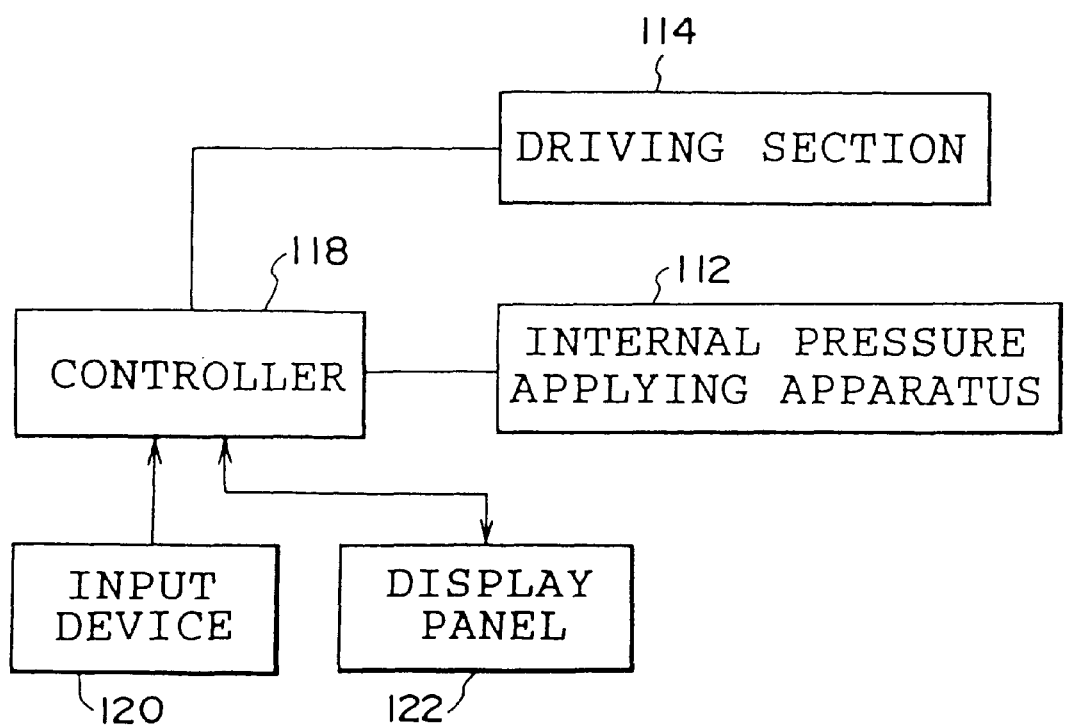
FIG. 5 is a block view of the PCI apparatus according to the present embodiment.

As shown in FIG. 5, the PCI apparatus 100 has a controller 118 which comprises unillustrated CPU, RAM, and ROM.

A program which controls the lengths of the ply cords in accordance with the material of the ply cords which form the tire 10 and the physical properties of the tire 10, and which carries out the control process of the configuration of the tire 10 is stored in the controller 118. In accordance with this program, the controller 118 determines the positional relationship between the rim 102 and the tire 10, and the PCI process time which corresponds to the time during which the bead portions 20 are held by the holding discs 106A and 106B.

The internal pressure applying apparatus 112 and the driving section 114 are connected to the controller 118. The controller 118 controls the driving section 114 to mount the tire 10 to the PCI apparatus 100, and thereby controls the internal pressure applying apparatus 112 to effect the PCI process for a predetermined time.

Further, an input device 120 and a display panel 122 are connected to the controller 118. The input device 120 inputs a large number of data which include RR waveform of the tire 10 before vulcanization and uniformity characteristics of the tire 10 after vulcanization. Together with the input data, the display panel 122 displays circumferential positions of the tire 10 or the like, which correspond to the position A at which the rim width is maximum and the position B at which the rim width is minimum. The input device 120 allows the measured RR waveform or the like to be inputted directly from the measuring device. However, instead of the input device 120, a keyboard which can input numeric values can be used.

The PCI apparatus 100 effects the control of the configuration of the tire 10 by corresponding the portion of the tire 10 corresponding to the peak portion of the RR waveform of the tire 10 before vulcanization to the position B of the rim 102 at which rim width is minimum, or by corresponding the portion of the tire 10 corresponding to the bottom portion of the RR waveform of the tire 10 before vulcanization to the position B of the rim 102 at which the rim width is maximum. Accordingly, the elongation of the ply cords can be controlled, and uniformity characteristics of the tire 10 are thereby changed. This restraining position can be specified from RFV after vulcanization when RFV of the tire 10 after vulcanization has already been known as a product which has been subjected to a PCI process under the same conditions as the tire 10 immediately after vulcanization.

Operation of the present embodiment will be described hereinafter.

RR of the tire 10 before vulcanization is measured by a known method and represented as a wave form. Ordinarily, the resultant RR waveform shows a peak portion and a bottom portion of the wave form. The peak portion corresponds to the longest ply cords of the carcass 14. On the other hand, the bottom portion corresponds to the shortest plycords of the carcass 14.

In the PCI Step, when a predetermined internal pressure is applied into the tire 10 at a high temperature of 80° C. or more, a tensional force is applied to the plycords of the carcass 14. Accordingly, the plycords of the carcass 14 are elongated until they are stabilized.

When such tire 10 as described above is fitted onto the rim 102, the bead portions 20 are held by the circumferential edges of the holding discs 106A and 106B of the rim 102 from the outside portion of the tire 10. The elongation of the ply cords at the bead portions 20 is controlled by this restraint.

The tensional force which is applied to the ply cords is the smallest when the tire 10 is held at the position B of the rim 102 (having a minimum width), and the tensional force is the largest when the tire 10 is held at the position A of the rim 102 (having a maximum width).

Figure 6:
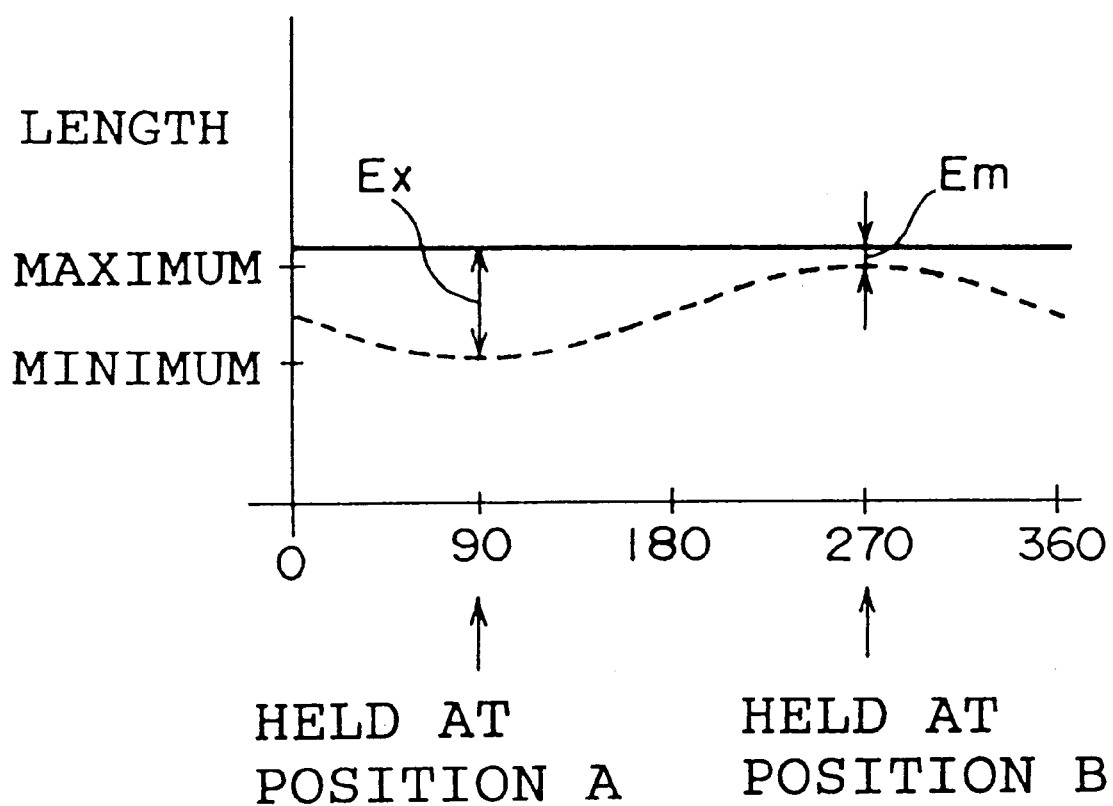
FIG. 6 is a graph which illustrates the length of the ply cord of a tire which is mounted to the PCI apparatus according to the present embodiment.

For this reason, as shown in FIG. 6, the ply cords at the peak portion of the RR wave form (shown by a broken line in FIG. 6), and is held at the position B are elongated slightly during the PCI process (see arrow $E_m$). The ply cords at the bottom portion of the RR waveform held at the position A are elongated largely during the PCI process (see arrow $E_x$).

Therefore, the elongation of the ply cords is caused to vary so that the difference between the lengths of the RR waveform can be reduced at the peak portion and the bottom portion thereof. As a result, after the PCI process, the ply cords have substantially the same length in the circumferential direction of the tire (illustrated by a solid line in FIG. 6), the configuration of the tire 10 is controlled, and the roundness of the tire 10 can thereby be increased.

Figure 7:
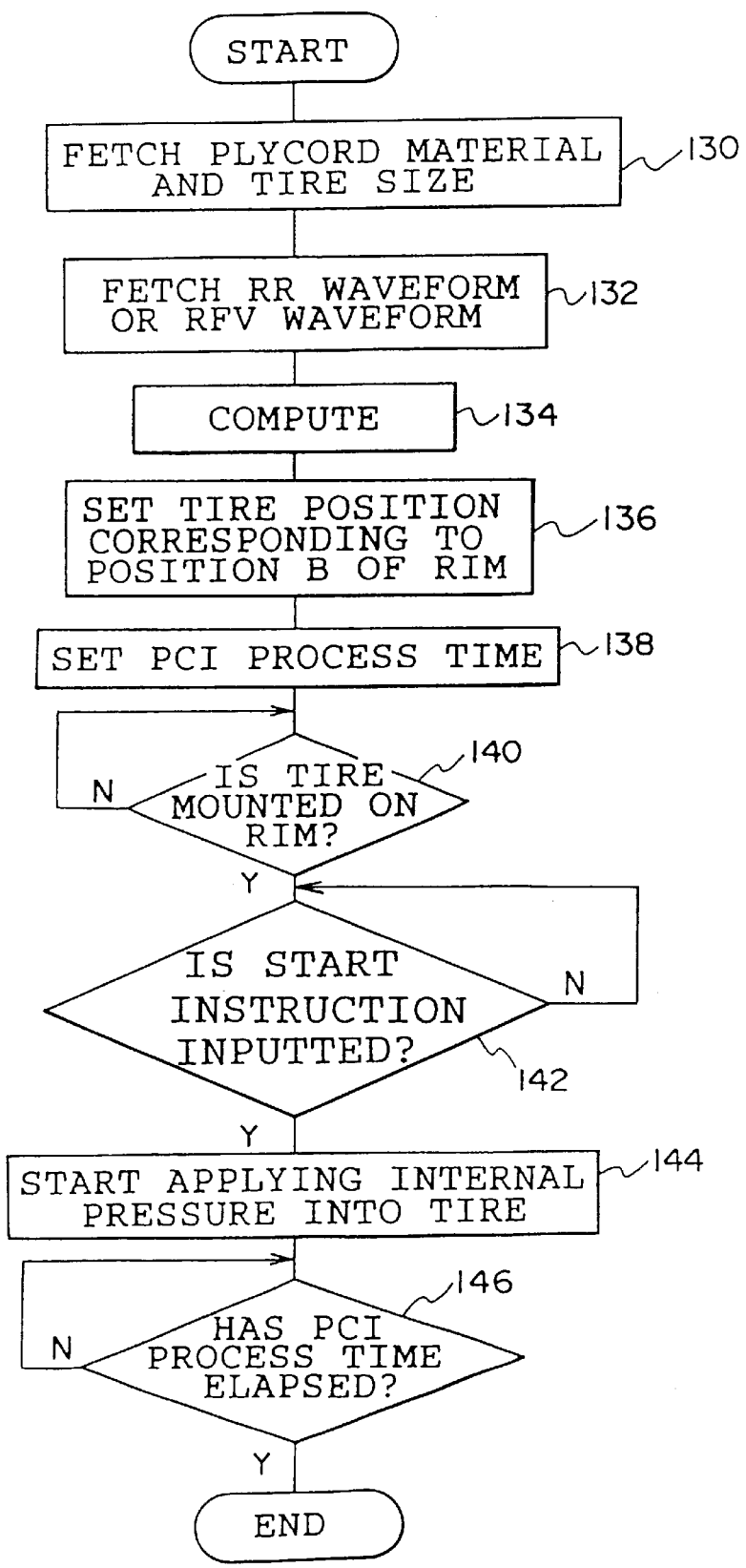
FIG. 7 is a flowchart which illustrates a PCI process and a control process of the configuration using the PCI apparatus according to th e present embodiment.

With reference to FIG. 7, a description of the control process of the configuration of the tire 10 will be given hereinafter. A flowchart which illustrates an example of the control process of the configuration of the tire is shown in FIG. 7. As an example, a case in which a rim 102 having a specified configuration is used to control the configuration of the tire 10 by corresponding the peak portion of the RR waveform of the tire 10 to the position B at which the rim width is minimum will be explained.

In Step 130, when the material of the ply cords of the carcass 14 of the tire 10 which is subjected to the PCI process and the size of the tire 10 are fetched, in Step 132, RR waveform or RFV waveform of the tire 10 is fetched. Data are input from the input device 120 which is equipped at the PCI apparatus 100 by a predetermined operation. Further, this input can be confirmed by displaying the same the display panel 122 provided at the PCI apparatus 100.

After RR waveform or RFV waveform of the tire 10 has been fetched, in Step 134, computation is effected on the basis of the RR or RFV waveform fetched. In Step 136, the position of the tire 10 is determined so as to correspond to the position A of the rim 102. Further, information about the rim such as the configuration of the rim 102, or the difference between the maximum value and the minimum value thereof has already been fetched in the controller 118. For this reason, in accordance with the configuration of the rim 102, the position of the tire 10 is set. The origin for measuring the position of the tire 10 is set at the measuring time of RR waveform. The position of the tire is positioned so as to form an angle with respect to the origin.

When the position of the tire 10 is set, in Step 138, the PCI process time is determined. The PCI process time is set as a time needed for appropriately completing the control of the configuration of the tire 10 by controlling the elongation of the ply cords ununiformly, on the basis of ununiformed rim width, and for stabilizing the elongation of the ply cords by applying a high temperature immediately to the tire 10 after the vulcanization.

After the PCI process time has been set, in Step 140, it is determined whether or not the tire 10 has been mounted on the rim 102. The judgment will be negative until the tire 10 is fitted onto the rim 102 and is mounted to the PCI apparatus 100.

In the PCI apparatus 100, the tire 10 for which a vulcanization process has been effected at a high temperature when it is molded is conveyed by a tire conveying means (not shown) and is held by the rim 102 of the PCI apparatus 100. When the tire 10 is held by the rim 102, the driving section 114 is driven so as to separate the cylinder 104A from the cylinder 104B. Because the circumferential edge portion of the separated cylinder 104B has a size which is smaller than the internal circumference of the tire, the cylinder 104B is facilitated to be positioned and mounted inside of the tire 10. The tire 10 is mounted such that the peak portion of RR waveform corresponds to the position B at which the rim width is minimum. The holding portion 105 of the holding disc 106B is disposed beneath the bead portion 20 of the tire 10.

When the tire 10 is mounted on the rim 102, the driving section 114 is driven so that the cylinder 104A is closer to the cylinder 104B, the cylinder 104A and the cylinder 104B are integrated with each other so as to form the main body 104. At the same time, the tire 10 is mounted to the PCI apparatus 100, and thereafter, the bead portions 20 of the tire 10 are held by the holding portions 105 of the holding discs 106A and 106B, respectively, inwardly of the tire 10.

When the tire 10 is held by the rim 102, in Step 142, it is determined whether or not "start" instruction is inputted. The judgment will be negative until "start" instruction is inputted.

When "start" instruction is inputted through the input device 120, the judgment is affirmative. The routine goes to Step 144 where the application of the internal pressure into the tire is started.

When the internal pressure is applied into the tire 10, the internal pressure applying apparatus 112 supplies the compressed air at the temperature of 80° C. or more. The compressed air is supplied from the internal pressure applying apparatus 112 to the rim 102 along the central axis of the rim 102, and is supplied into the internal portion of the tire 10 through the air holes 108 formed on the circumferential surfaces of the rim 102. The internal pressure applying apparatus 112 controls the compressed air pressure so as to have substantially the same amount of pressure as the tire 10.

When the application of the internal pressure into the tire 10 is started, in Step 146, it is judged whether or not the PCI process time has elapsed. The judgment will be negative until the PCI process time elapses. Further, the PCI process time is computed from when "start" instruction has been inputted.

During the PCI process, a tensional force is applied to the ply cords of the carcass 14. At this time, because the bead portions 20 are held by the holding discs 106A and 106B of the rim 102 so as to be closer to each other, the elongation of the ply cords is controlled in accordance with the rim width. The elongation of the ply cords, which are held at the peak portion of the RR or RFV wave form so as to correspond to the position B at which the rim width is minimum, is small. Accordingly, the ply cords are elongated so as to vary in the circumferential direction of the tire 10 on the basis of the configuration characteristics such as RR or RFV waveform of the tire 10. As a result, the lengths of the ply cords are controlled over the entire circumference of the tire 10 so as to have substantially the same length.

When the PCI process time has elapsed and the tire 10 has been cooled to a preset temperature, the judgment is affirmative and a series of processes has been completed.

In this way, during the PCI process, the elongation of the ply cords is controlled in accordance with the rim width which is defined on the basis of the configuration characteristics of the tire 10, and the lengths of the ply cords are uniformed in the circumferential direction of the tire 10. Accordingly, the configuration of the tire 10 after PCI can be controlled so that the tire 10 whose roundness is high and which is excellent in uniformity characteristics can be obtained.

Further, since the configuration of the tire 10 is controlled by the pressure which is substantially the same as the pressure applied to the tire during PCI, it is not necessary to abrade the tire 10 and to apply a high pressure process thereto. Accordingly, it is possible to control the configuration of the tire 10 effectively by making use of the energy from the PCI process.

Because it is possible to effect both the control process of the configuration of the tire and the PCI process by controlling the elongation of the ply cords on the basis of the configuration of the rim 102, the present invention can easily be applied to the existent PCI apparatus without changing the equipment largely.

In the present embodiment, the rim 102 of which the rim width varies in the circumferential direction at the same ratio and which is formed in a fixed configuration having the position A and the position B respectively provided at one point on the rim 102 is used. However, the present invention is not limited to this.

For example, the holding discs 106A and 106B of the rim 102 can be structured such that the joint position thereof can be controlled, and the difference between the minimum value and the maximum value of the rim width can be changed arbitrarily. Therefore, it is possible to change the minimum value and the maximum value in accordance with the tire 10. And it is possible to control the configurations of a plurality of various tires 10 and different types of tire 10 by using only rim.

Figure 8A:
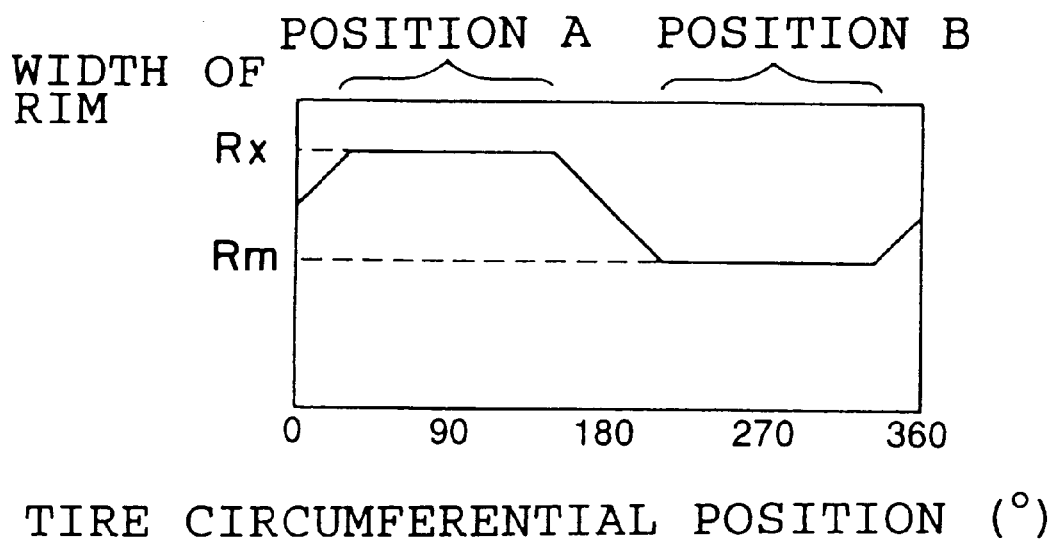
FIG. 8A is a graph which illustrates the change of the width of another rim according to the present embodiment.

The position A and the position B are not needed to be provided at the rim at one point, respectively. Namely, as shown in FIG. 8A, it is possible to use a rim whose width may vary in the circumferential direction of the rim 102 at the different ratio, and formed in an area where the position A at which the rim width is maximum and the position B at which the rim width is minimum connect to each other. In this case, at the joint portion of the tire 10, the elongation of the ply cords can be controlled uniformly.

In the present embodiment, for example, the rim 102 which is previously formed in a fixed manner which can be applied to the tire 10 having a single configuration has been employed. However, it is not limited to this. The rim can be formed into any configuration which is applicable to the tire 10 on the basis of RR or RFV wave form of the tire 10. Accordingly, the rim 102 which corresponds to the configuration of the tire 10 can be selected from a plurality of rims having various configurations and mounted to the PCI apparatus 100, the control process of the configuration of the tire 10 and the PCI process can be carried out.

In the present embodiment, the configuration of the tire 10 is controlled by corresponding the elongation of the ply cords to the position B at which the rim width is minimum at the peak portion of RR waveform of the tire 10. However, the configuration of the tire 10 can be controlled by corresponding the elongation of the ply cords to the position A at which the rim width is minimum at the bottom portion of RR waveform of the tire 10. Therefore, the same effect as the present embodiment can be obtained. Further, the peak portion of RR wave form of the tire 10 may be corresponded to the position B. The bottom portion of RR wave form of the tire 10 may be corresponded to the position A. Accordingly, the elongation of longer ply cords is controlled at maximum, while the elongation of shorter ply cords is controlled at minimum. As a result, it is possible to control the configuration of the tire 10 to be closer to a perfect roundness, more effectively.

In the present embodiment, the cylinder 104A and the cylinder 104B are jointed integrally with each other so as to form the main body of the rim 102. However, the present invention is not limited to this embodiment. For example a main body which is formed in an integrated manner can be used. In the case of the integrated main body, the tire 10 is fitted onto the rim 102 such that the bead portions 20 of the tire 10 are positioned at the internal portion of each of the holding portions 105 of the rim 102. Accordingly, the similar effect to the above-described embodiment can be provided.

Further, the holding portions 105 of the rim 102 need not to be positioned at the end of each of the holding discs 106A and 106B which are fixed to the circumferential edges of the rim 102, respectively.

Figure 8B:
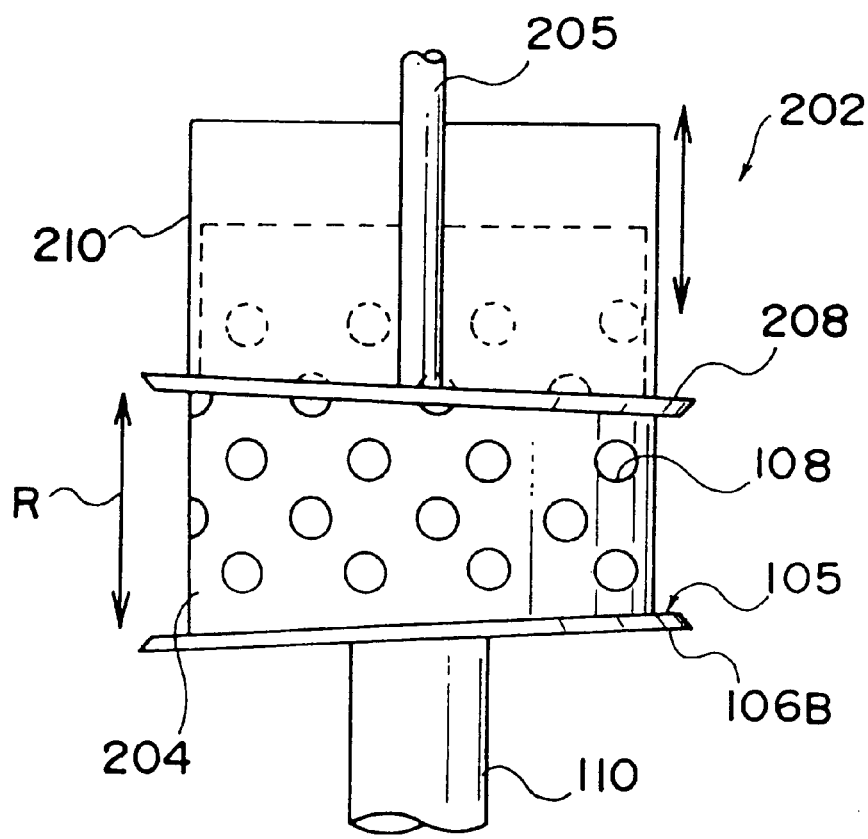
FIG. 8B is a side view of yet another rim according to the present embodiment.
Figure 9A:
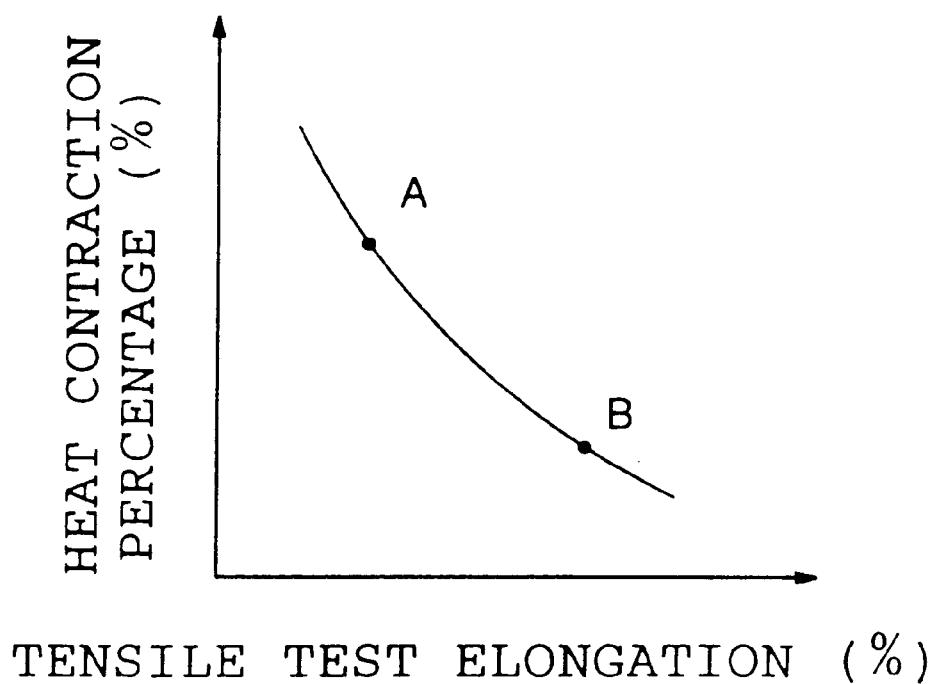
FIG. 9A is a graph which illustrates a relationship between a heat shrinkage (contraction) percentage and a tensile test elongation, of ply cords.
Figure 9B:
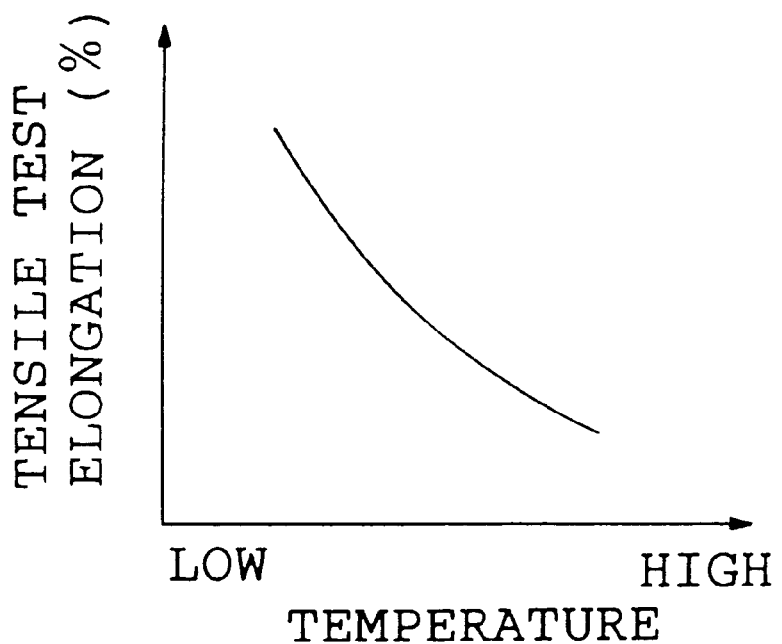
FIG. 9B is a graph which illustrates a relationship between a tensile test elongation of ply cords and a temperature of a tire.

Another type of rim 202 is shown in FIG. 8B. In this rim 202, the central axis 110 of the rim is connected to the holding disc 106B. The holding disc 106B is disposed at the lower side (in FIG. 8B) of a main body 204 which is formed by a hollow cylindrical member. A number of the air holes 108 are punched on the circumferential surface of the main body 204.

A holding portion 208 which can move vertically along the circumferential surface of the main body 204 is disposed at the circumferential surface of the main body 204. This holding portion 208 is supported by a supporting shaft 205. The width (size) between the holding portion 208 and the holding disc 106B opposing each other (which is indicated by arrow R) may vary along the circumferential surface of the main body 204.

A cover 210 is provided at the holding portion 208 in the opposite direction of the holding disc 106B so as to cover the air holes 108 of the main body 204, the air holes 108 being located at the upper portion of the holding portion 208. The cover 210 moves in co-operation with the movement of the holding portion 208, and prevents the compressed air, which has been supplied for applying a predetermined internal pressure into the tire 10, from being discharged from the air holes 108 which are disposed at the upper portion of the tire 10.

An unillustrated driving section is connected to the supporting axis 205. This driving section operates to move the holding portion 208 on the basis of the configuration characteristics of the tire 10 which is held by the rim 202, and changes the width (size) between the holding portion 208 and the holding disc 106B being away from each other.

When the tire 10 is mounted on the rim 202 thus structured, the upper end portion of the main body 204 is exposed by the holding portion 208 being pulled from the main body 204. Because the upper end portion of the main body 204 has a diameter which is smaller than the diameter of the internal circumference of the tire 10, it is easy to mount the tire 10 to the rim 202. When the tire 10 is mounted to the rim 202, the supporting axis 205 is driven so as to move the holding portion 208 toward the holding disc 106B. Accordingly, the bead portions 20 of the tire 10 can be held by the holding portion 208, and the holding portion 105 of the holding disc 106B.

In the same manner as described above, because the bead portions 20 of the tire 10 are held at the holding width which may vary along the circumeferential surface of the rim 202, the elongation of the ply cords at the bead portions 20 can be controlled, and accordingly, the configuration of the tire 10 can be controlled. Further, since it is possible to change the separating width (size) between the holding portion 208 and the holding disc 106B which separate from each other, on the basis of configuration characteristics of each of tires 10, the separating width between the holding portion 208 and the holding disc 106B can be changed uniformly and the configuration of each tire 10 can be modified appropriately.

60 (sixty) radial tires for a passenger car each having a size of 205/70 R14 were divided into two groups by 30 (thirty) per a group. Polyester cords were used for the carcass of the tire.

Immediately after vulcanization, a tire from one group (Example) was mounted to a PCI apparatus having a rim according to the present embodiment. The difference between a maximum value and a minimum value of the rim is made to be 2 mm.

A tire from the other group (Comparative Example) was mounted to another PCI apparatus in which holding discs facing each other are disposed in parallel with each other immediately after a tire was vulcanized, and has a rim whose rim width makes no difference, which is, 0 (zero) in the circumferential direction thereof.

Values of RFV and RR (product values) were measured for the group of tires in the example and the group of tires in the comparative example after PCI, respectively. The measured results are shown in Table 1.

TABLE 1

|  | RR(mm) | RFV(N) |
| --- | --- | --- |
| Example | 0.41 | 42.0 |
| Comparative Example | 0.51 | 62.1 |

As shown in Table 1, in Example, a tire is held by a rim according to the present embodiment. The rim width of the rim may vary in the circumferential direction of the tire so that the elongation of ply cords is controlled. The tire expressed values which are lower by 0.1 mm in the mean value of RR and by 20.1N in the mean value of RFV as compared to the tire in Comparative Example in which a tire is held by a rim whose rim width may not vary in the circumferential direction thereof.

It should be understood that the tire in Example has a higher degree of roundness and more excellent uniformity characteristics.

Therefore, since the elongation of the ply cords can be controlled by using a rim whose width may vary in the circumferential direction thereof, it is possible to improve uniformity characteristics of a tire more effectively without causing a damage to the appearance of the tire.

Figure 10:
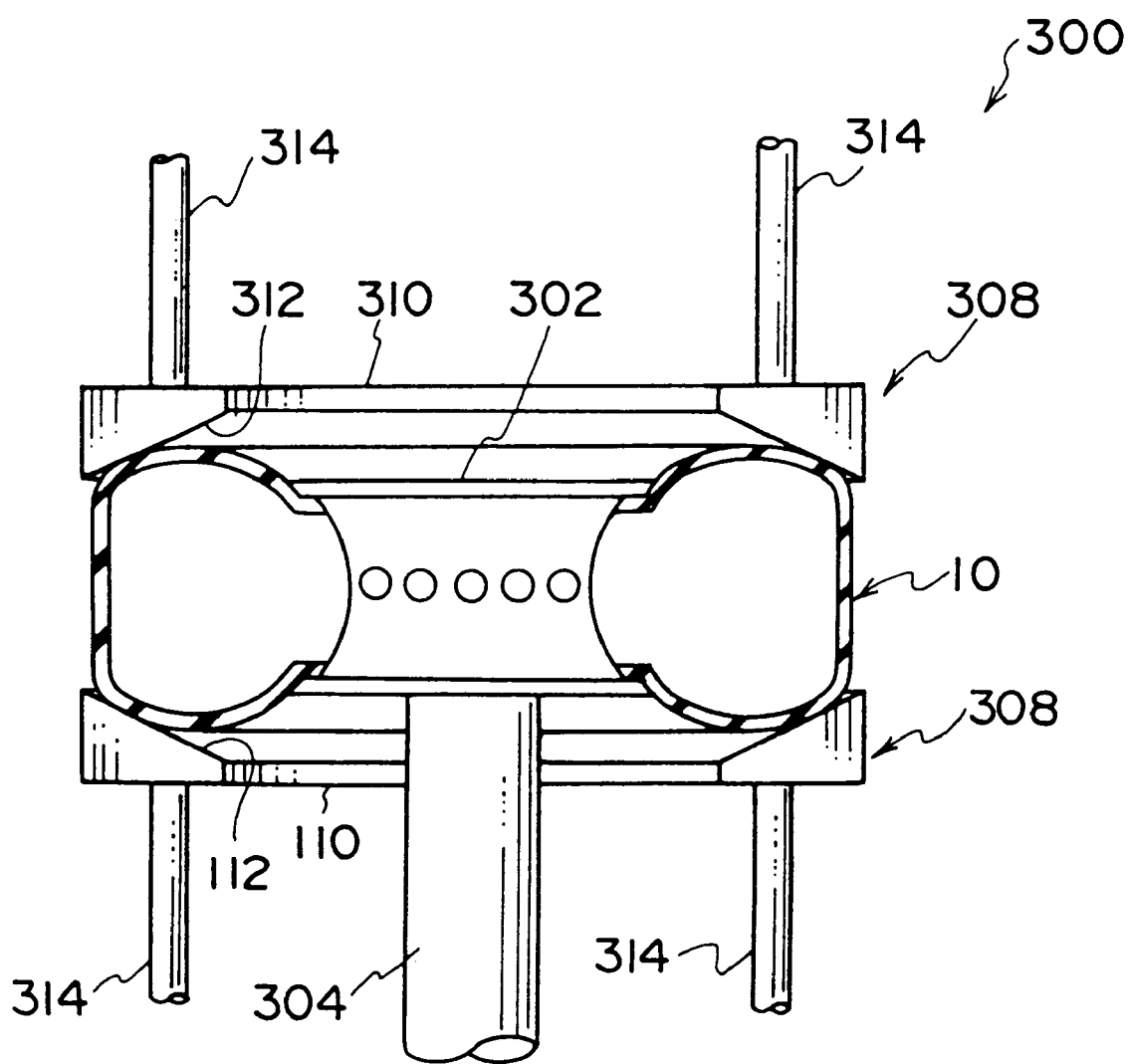
FIG. 10 is a schematic cross sectional view of a PCI apparatus according to a second embodiment of the present invention.
Figure 11:
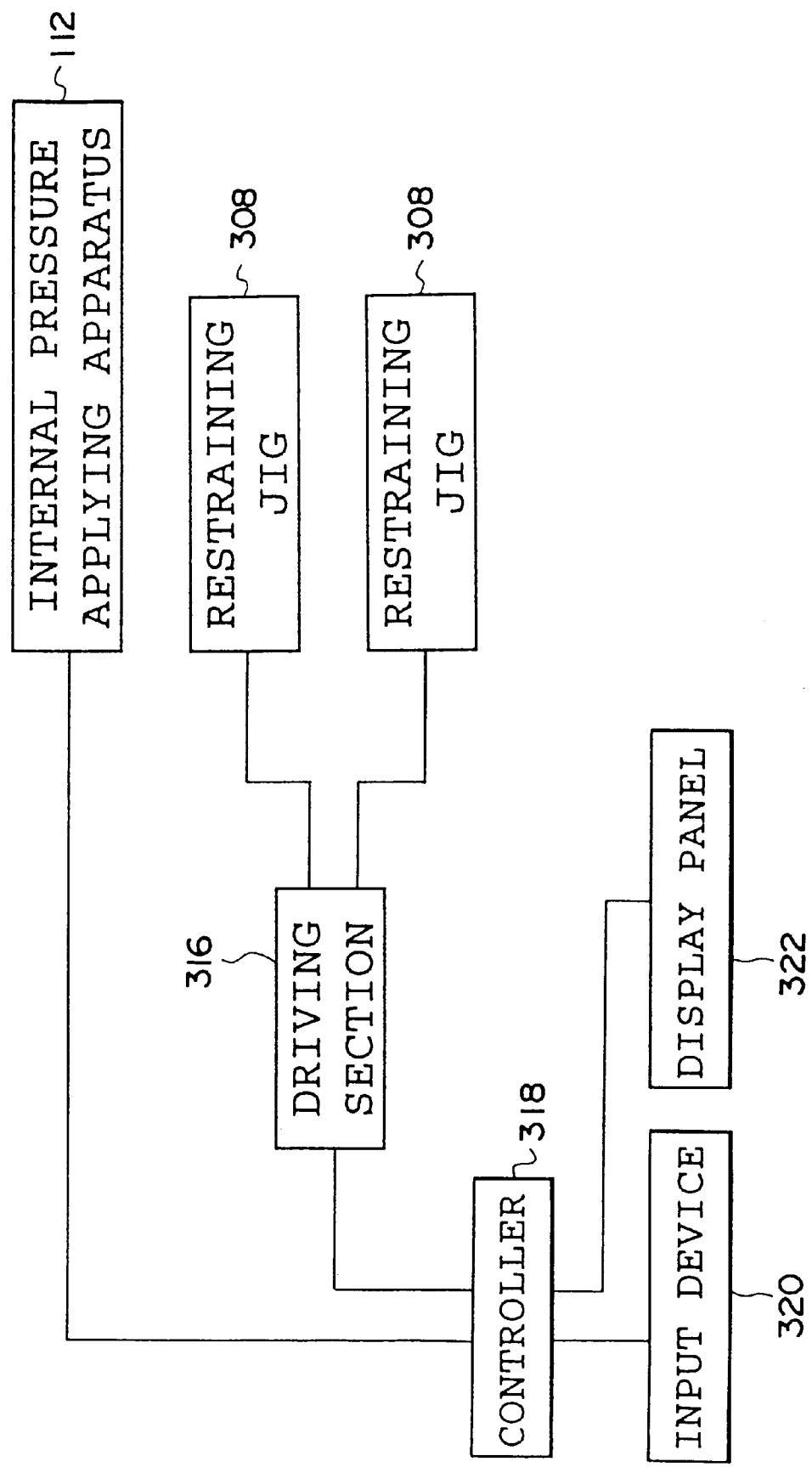
FIG. 11 is a block view of the PCI apparatus according to a second embodiment of the present invention.

A PCI apparatus 300 according to a second embodiment of the present invention is shown in FIGS. 10 and 11. A tire 10 immediately after vulcanization is mounted to the PCI apparatus 300.

As shown in FIG. 10, a rim 302 for supporting the tire immediately after vulcanization at the central portion in the diametrical direction of the tire 10 is provided at the PCI apparatus 300. The tire 10 whose radial direction is oriented to the horizontal direction of the PCI apparatus 300 is supported by the rim 302.

One end of the cylindrical rim central axis 304 is connected to the rim 302. Further, the other end of the rim central axis 304 is connected to the internal pressure applying apparatus 112 having the same structure as described above (see FIG. 5).

The rim central axis 314 and the rim 302 are formed by a hollow member. Further, air holes which are structured in a similar manner to those in FIG. 1 are formed on the rime 302. For this reason, the compressed air outputted from the internal pressure applying apparatus 112 is supplied into the tire 10 through the rim central axis 304 and the rim 302.

A pair of restraining jigs 308, which are each formed in a circular arc, clamp the tire 10, are concentric with the tire 10, and are disposed in the vertical direction of the rim 302 in FIG. 10.

Figure 12A:
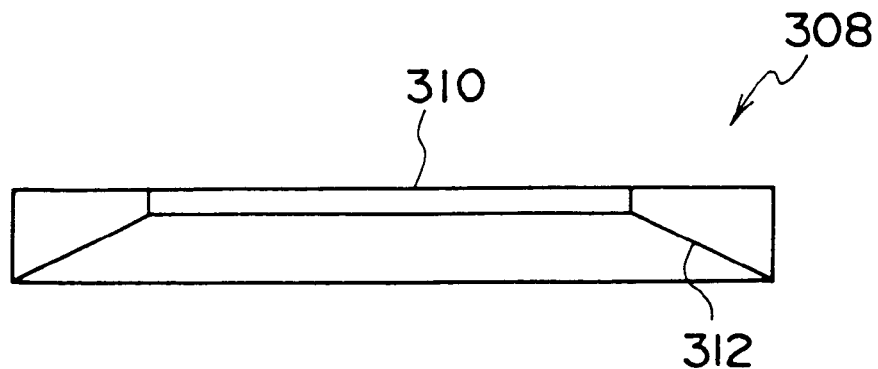
FIG. 12A is a side view of a restraining jig of the PCI apparatus according to the present embodiment.
Figure 12B:
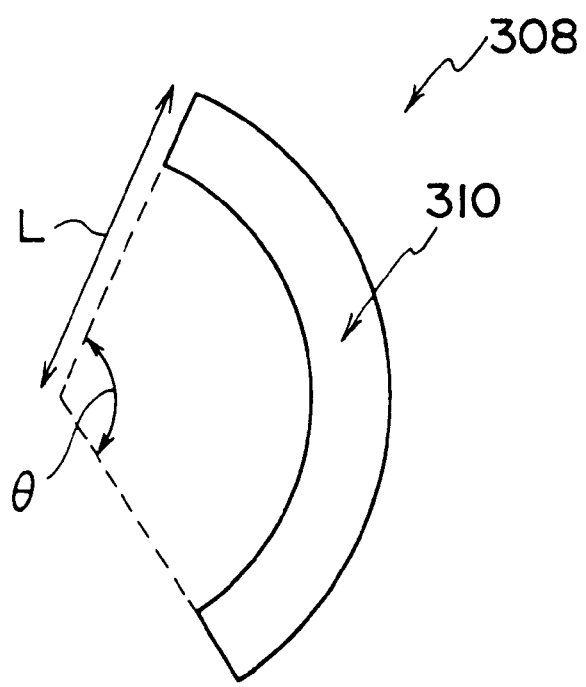
FIG. 12B is a plan view of FIG. 12A.

As shown in FIG. 12, each of the restraining jigs 308 has a circular arc portion which forms an angle so as to correspond to a predetermined central angle θ (see FIG. 12B), the length L from the center of the circular arc to the outer circumferential end of each of the restraining jigs 308 (see FIG. 12B) is substantially equal to the radial diameter of the tire 10 which is supported by the rim 302.

Each of the restraining jigs 308 is provided with a supporting surface 310 and a restraining surface 312. The supporting surface 310 is substantially leveled to the surface corresponding to the side surfaces of the tire 10 in the circumferential direction of the tire 10 which is supported by the rim 302. The supporting axes 314 each of which is connected to the driving section 316 (see FIG. 11) are mounted to the supporting surface 310 so as to be detachable. The driving section 316 causes each of the supporting axes 314 to move vertically by a predetermined amount.

The restraining surface 312 has a slope whose thickness increases from the central side end portion to the external side end portion of the restraining jig 308 (see FIG. 12A). For this reason, in the restraining jig 308, the restraining surface 312 is disposed so as to face the shoulder portion 24 of the tire 10.

The restraining jig 308 can be formed from various materials such as metals, plastics, rubbers and the like. From a standpoint of the control of a cooling rate of the tire 10, it is preferable to use metals.

The restraining jig 308 is selected, from a plurality of the restraining jigs 308 whose central angles θ are different, on the basis of the restraining conditions of the tire 10, and the selected restraining jig 308 is mounted to the supporting axes 314 so as to be exchangeable.

A controller 318 having CPU, RAM, and ROM (not shown) is provided at the PCI apparatus 300.

The controller 318 stores therein a program which carries out the control process of the configuration of the tire 10 by controlling the lengths of the ply cords in accordance with the quality of the ply cords for forming the tire 10 and the physical properties of the tire 10. In accordance with the program, the controller 318 sets restraining conditions for restraining the tire 10 which is supported by the rim 302.

The driving section 316 and the internal pressure applying apparatus 112 are connected to the controller 318. The controller 318 outputs, to the driving section 316 and the internal pressure applying apparatus 112, a driving signal corresponding to the set restraining conditions, and controls the restraining position, the restraining pressure, the pushing amount, and the internal pressure of the tire 10, with respect to the tire 10, by the restraining jigs 308.

The restraining pressure by the restraining jig 308 may vary due to the internal pressure, the quality of plycords, and the size, and the physical properties of rubber, of the tire 10. However, usually, the restraining pressure may be between 0.5 and 5 kgf/cm$^2$. If the restraining pressure is lower than 0.5 kgf/cm$^2$, it is not preferable because this restraining pressure does not allow the elongation of the plycords to be controlled. If the restraining pressure is higher than 5 kgf/cm$^2$, it is neither preferable because the plycords may elongate inwardly of the tire 10, and due to a high restraining pressure, the lengths of the plycords at the unrestrained portion of the tire 10 may cause excessively. Accordingly, preferably, the internal pressure of the tire 10 may be between +0.1 and 1 kgf/cm$^2$. When the tire 10 is restrained within the aforementioned range of the restraining pressure which is higher than the aforementioned internal pressure, an excellent restraint of the plycords can be provided.

The pushing amount of the restraining jig 108 is a sizable amount by which the tire 10 is pushed by a pushing pressure. Preferably, the pushing amount is between 0.5 mm and 5 mm, and more preferably, between 2 mm and 3 mm.

Further, an input device 320 and a display panel 322 are connected to the controller 318. The input device 320 inputs various data for RR waveform of the tire 10 before vulcanization, uniformity characteristics after vulcanization, and the like. The display panel 322 displays the input data and various types of operating states. The measured RR waveform or the like can be inputted directly from the measuring device by the input device 320. However, such data can be inputted through a keyboard by which the input of numeric values is enabled.

The control process of the configuration of the tire is carried out by the controller 318 such that a portion of the tire 10 which corresponds to the peak portion of RR waveform of the tire 10 before vulcanization is detected as a restraining position, and the restraining position of the tire 10 is restrained so that uniformity characteristics of the tire 10 can be controlled. The restraining position can be specified from RFV of the tire 10 after vulcanization in a case in which RFV of the tire 10 after vulcanization has already been known as a tire product which has been subjected to the PCI process under the same conditions as the tire 10 immediately after vulcanization has already been known.

Operation of the present embodiment will be explained hereinafter.

RR of the tire 10 before vulcanization is measured by a known method and is expressed as a waveform. Usually, the peak portion and the bottom portion of the waveform can be seen from the resulting RR waveform. The peak portion corresponds to the longest plycords of the carcass 14, while the bottom portion corresponds to the shortest plycords of the carcass 14.

During the PCI process, the plycords of the carcass 14 are elongated until they are stabilized when a predetermined internal pressure is applied into the tire 10 at a high temperature of 80° C. or more.

A portion of the tire 10, which corresponds to the peak portion of RR waveform is made to be a restraining position. During the PCI process, this restraining position is restrained so that the elongation of the ply cords at this portion is controlled. On the other hand, a portion of the tire 10, which corresponds to the bottom portion of RR waveform is set in an open state so that the plycords at this portion may be made longer. Accordingly, the difference between the lengths of the plycords at the peak and bottom portions of RR waveform is minimized so that it becomes possible to uniform the size of the tire 10. As a result, the configuration of the tire 10 is controlled, and the roundness of the tire 10 can be improved.

A flowchart which illustrates an example of the control process of the configuration of the tire 10 is shown in FIG. 13.

In Step 400, it is judged whether or not the tire 10 has been mounted to the PCI apparatus 300.

In the PCI apparatus 300, the tire 10 for which a vulcanization process at a high temperature has been effected by molding is conveyed by an unillustrated tire conveying means, and is held by the rim 302 of the PCI apparatus 300. When it has been detected that the tire 10 has been held by the rim 302, the judgment is affirmative and it is thereby judged that the tire 10 has been mounted to the rim 302. The routine goes to Step 402.

In Step 402, the quality of the plycords and the size of the tire are fetched. In Step 404, RR or RFV waveform of the tire 10 which has been held by the rim 302 is fetched. These data are inputted from the input device 320 which is provided at the PCI apparatus 300. Moreover, the confirmation of the input data can be effected by displaying the data on the display panel 322 provided at the PCI apparatus 300.

When RR or RFV waveform are fetched, in Step 406, a computation is effected on the basis of the fetched RR or RFV waveform. In Step 408, the restraining amount and the restraining position of the tire 10 is set. The restraining amount is the amount of load needed for the control of the configuration of the tire 10, and is determined on the basis of the magnitude of the peak portion of the waveform.

When the restraining amount and the restraining position have been determined, in Step 410, the restraining pressure or the pushing amount and the restraining time are determined. The restraining pressure or the pushing amount is determined on the basis of the internal pressure which is applied into the tire 10 during the PCI process, the temperature, and the quality of the ply cords. The restraining time is set by the restraining amount, and the restraining pressure or the pushing amount.

"The restraining pressure or the pushing amount of the tire" has been thus expressed because the restraining pressure closely relates to the pushing amount. When the pushing amount is controlled, the restraining pressure is thereby controlled. Accordingly, since the control of one of the value of the restraining pressure and the pushing amount will be satisfactory, a simple method can be provided in which conditions for the restraining pressure can be omitted.

When various conditions including the restraining position, the restraining pressure or the pushing amount, and the restraining time have been determined, in Step 412, it is judged whether to start PCI or not.

The restraining jigs 308 which suffice the restraining conditions are fixed to the supporting axes 314. When "Start" instruction is inputted through the input device 320, the judgment is affirmative, and the routing proceeds to Step 414 where the application of the internal pressure into the tire 10 is started. In Step 416, the restraint of the tire 10 is carried out.

When the internal pressure is applied, the internal pressure applying apparatus 112 supplies the compressed air at the temperature of 80° C. or more into the tire 10. The compressed air is supplied from the internal applying apparatus 112 into the rim 302 through the rim central axis 304, passes through the air holes formed on the rim 302, and is supplied into the internal portion of the tire 10. The internal pressure applying apparatus 112 controls the supplying pressure of the compressed air so as to have the same amount of pressure as the tire.

When the restraint of the tire 10 begins, a pair of restraining jigs 308 which are disposed vertically of the tire 10 are made close to the tire 10, respectively. Each of the restraining jigs 308 causes the restraining surfaces 312 to abut the shoulder portions 24 of the tire 10 and pushes the tire 10 with a predetermined pressure so that the tire 10 is restrained.

When the restraint is started, in Step 418, it is judged whether or not the restraining time has elapsed. The judgment is negative until the restraining time elapses so that the restraint using the restraining jigs 308 is maintained. The elongation of the plycords which are disposed at the restraining position of the tire 10 is controlled by carrying out the restraint during the PCI. The plycords which are not disposed at the restraining position of the tire 10 can be elongated. Accordingly, lengths of the ply cords are uniformed along the entire circumference of the tire 10.

When the restraining time has passed, the judgment is affirmative, and the routine proceeds to Step 420 where the restraint is canceled. When the restraint is canceled, the restraining jigs 308 are separated from each other by each of the supporting axes moving vertically. Accordingly, the restraining surface 312 of the restraining jig 308 is separated from the shoulder portion 24 of the tire 10, which has been determined as the restraining position, and the shoulder portion 24 is set in an open state. At this time, because the ply cords of the carcass 14 is in a stabilized state, the ply cords do not elongate.

When the restraint is canceled, in Step 422, it is judged whether to stop PCI or not. The judgment is denied until PCI is terminated. The PCI process is continued until the tire 10 is cooled to the set and predetermined temperature.

When the tire 10 has a predetermined temperature, the judgment is affirmative so that a series of processes are completed.

In this way, the tire 10 is restrained at the restraining position thereof by a predetermined pressure or by a predetermined pushing amount, while PCI is carried out. Therefore, the elongation of the ply cords at the shoulder portion 24 is controlled, and the lengths of the ply cords are uniformed. Accordingly, the configuration of the tire 10 after PCI is controlled so that the tire 10 which has a high degree of roundness, and which is excellent in uniformity characteristics can be manufactured.

Further, since the configuration of the tire 10 is controlled by applying to the tire 10, the pressure which has substantially the same amount as the pressure for the tire 10 during PCI, the configuration of the tire 10 can be controlled effectively without abrading the tire 10 and without applying a high pressure process thereto.

In addition, when a plurality of tires which have already been known to have the same RR or RFV waveform are processed at the same time, after the setting of the restraining conditions of the tire 10 has been effected once, the restraining process or PCI is merely effected continuously.

In the present embodiment, the restraining jigs 308 in which the central angle θ=160° and each of the inclining surfaces is used as the restraining surface in order to restrain the shoulder portions 24 of the tire 10 are used. However, the present embodiment is not limited to this.

Figure 14A:
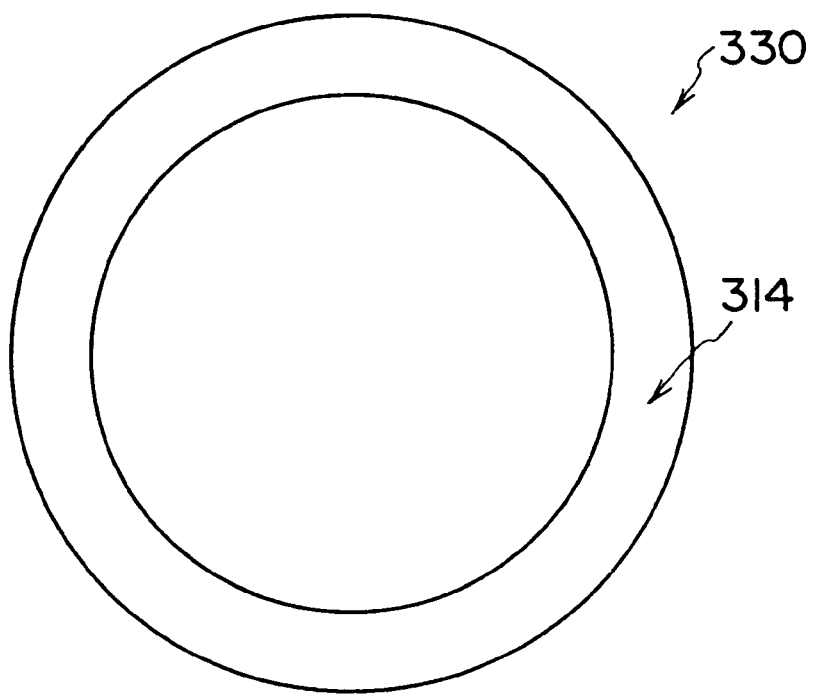
FIG. 14A is a plan view of another restraining jig of the PCI apparatus according to the present embodiment.

FIG. 14A shows a plane view of another restraining jigs 330 each of which is formed in a ring shape. The restraining jig 330 has a central angle θ=360°. Accordingly, each of the side surfaces of the tire 10 can be restrained along the entire circumference thereof.

Figure 14B:
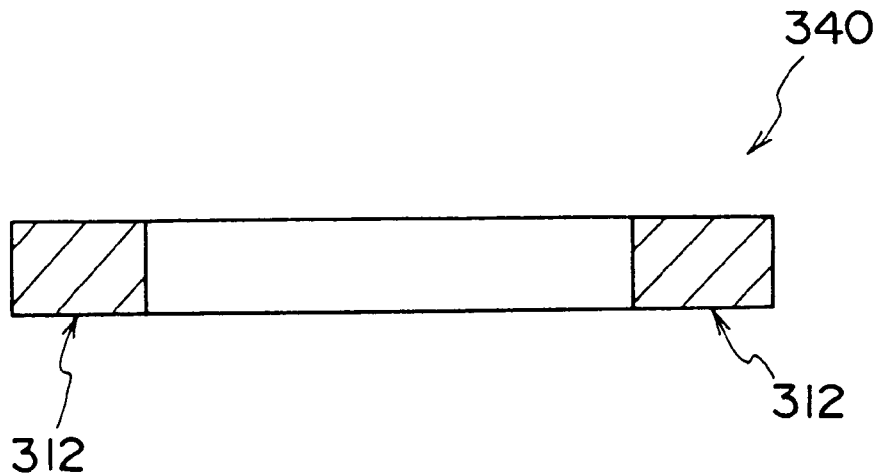
FIG. 14B is a cross sectional view of another restraining jig of the PCI apparatus according to the present embodiment.

Further, a cross sectional view of yet another restraining jigs 340 is shown in FIG. 14B. Each of the restraining jigs 340 has a flat restraining surface 312. Accordingly, each of the side walls 18 of the tire 10 can be restrained by the restraining jig 340 so that the elongation of the ply cords can be controlled.

In the present embodiment, the restraining jigs 308. in which a fixed central angle θ=160° is used. However, the present embodiment is not limited to this. The area of each of the restraining surfaces 312 of the restraining jig 308 may be variable within 0<θ<360. Accordingly, even when the area of the restraining surface 312 at the restraining position may vary for each tire 10, a plurality of tires 10 can be restrained by a pair of restraining jigs 308 by controlling the central angle θ in accordance with the area at the restraining position of the tire 10.

In the present embodiment, a pair of the restraining jigs 308 are disposed for the tire 10. However, three pairs of the restraining jigs 308 or more can be provided in accordance with the number of the restraining positions of the tire 10. Therefore, because the circumferential surface of the tire 10 can be restrained in a detailed manner at a plurality of positions, the tire 10 can be restrained under the restraining conditions corresponding to the respective restraining positions. As a result, more uniformed sizing can be carried out.

Moreover, in the present embodiment, the tire 10 is restrained at a restraining position which has been determined on the basis of RR waveform which has been measured previously or a known RFV. However, the present embodiment is not limited to this.

For example, by providing a sensor which can measure or estimate the configuration of the tire 10 during the restraint or the degree of the control of the configuration of the tire 10 due to the restraint at the PCI apparatus 300, the configuration of the tire 10 during PCI and during the restraining process can be fetched sequentially. The restraining conditions such as the restraining position or the like may be changed on the basis of the configuration of the tire 10 at the real time during the restraining process. As a result, it is possible to further increase the roundness of the tire 10 after the tire 10 has been subjected to PCI process and a restraining process.

60 (sixty) radial tires 10 for a passenger car each having a size of 205/70 R14 were divided into two groups by thirty per a group. Polyester cords were used for the carcass of the tire.

Immediately after vulcanization, a tire from one group (Example) was mounted to a PCI apparatus having a rim according to the second embodiment, and a restraining process and PCI were effected on this tire. The restraining conditions are provided such that the internal pressure during PCI is 1.5 kgf/cm², the pushing amount is 2 mm, the restraining time is for 0.5 minute, and the PCI time is for 20 minutes. A restraining jig 108 whose central angle θ=160° and which is made of iron was used.

Meanwhile, a tire from the other group (Comparative Example) was mounted to another PCI apparatus 100 immediately after vulcanization. Merely PCI was effected on this tire. Comparative Example was effected in the same manner as Example except that the restraining process was not carried out.

Values of RFV and RR were measured for the group of tires in Example and the group of tires in Comparative Example after PCI, respectively. The measured results are shown in Table 2.

TABLE 2

|  | RFV(N) | | RR(mm) | |
| --- | --- | --- | --- | --- |
|  | Mean value | Standard deviation value | Mean value | Standard deviation value |
| Example | 59.9 | 12.2 | 0.40 | 0.075 |
| Comparative Example | 76.0 | 24.3 | 0.51 | 0.129 |

As shown in Table 2, the mean value of RFV of the tire 10 in Example in which the restraining process was effected on the tire 10 during PCI is lower by 16N as compared to the tire 10 in Comparative Example in which the restraining process was not effected on the tire 10 during PCI. The standard deviation value was also improved by about 50%.

RR value of the tire 10 in Example is also improved by about 20% as compared to the tire 10 in Comparative Example.

By this, it should be understood that the tire 10 in Example has a roundness which is higher than the tire 10 in Comparative Example so that uniformity characteristics was improved.

Accordingly, because the tire 10 is restrained at the restraining position while PCI is being carried out, the energy generated during PCI is used so that uniformity characteristics can be corrected more effectively without causing a damage to the appearance of the tire 10.

What is claimed is:

1. A tire configuration control method which controls the configuration of a tire after vulcanization, comprising the steps of:

restraining at least a portion of the area which extends from the side surfaces to the circumferential surface of a tire whose internal portion is in a high temperature state after vulcanization; and effecting a post cure inflation in a state in which the tire is restrained wherein the position of said tire which corresponds to the peak position of the measured radial runout is restrained and the position of said tire which corresponds to the bottom position of the measured radial runout is not restrained.

2. A tire configuration control method according to claim 1, wherein, on the basis of configuration characteristics of a tire before vulcanization or configuration characteristics of the tire after vulcanization, at least one of the restraining position, the restraining pressure, the restraining time, and the pushing amount at the restraining position of said tire are determined as restraining conditions.

3. A tire configuration control method according to claim 1, wherein one of the shoulder portions and the side wall portions of said tire is restrained.

4. A tire configuration control method according to claim 1, wherein the configuration of said tire is controlled by restraining the elongation of carcass cord members at the restraining position of said tire.

5. A tire configuration control method which controls the configuration of a tire after vulcanization, comprising the steps of:

holding the width between the bead portions of a tire whose internal portion is in a high temperature state after vulcanization so as to correspond to the holding width which is defined on the basis of configuration characteristics of a tire before vulcanization or configuration characteristics of a tire after vulcanization; and effecting a post cure inflation in a state in which the tire is held wherein the position of said tire which corresponds to the bottom position of the measured radial runout is held at a maximum holding width and the position of said tire which corresponds to the peak position of the measured radial runout is held at a minimum holding width.

6. A tire configuration control method according to claim 5, wherein said holding width varies in the circumferential direction of the tire.

7. A tire configuration control method according to claim 5, wherein, on the basis of configuration characteristics of a tire before vulcanization or configuration characteristics of a tire after vulcanization, at least one of the positional relationship between said tire and the holding width, the difference between a maximum value and a minimum value of the holding width, and the holding time are determined as holding conditions.

8. A tire configuration control method according to claim 5, wherein the portion between said bead portions of said tire is held by a holding apparatus whose distance between the circumferential edge portions thereof is varied on the basis of configuration characteristics of said tire before vulcanization or configuration characteristics of said tire after vulcanization.

9. A tire configuration control method according to claim 1, further comprising the steps of:

corresponding the position of the tire which corresponds to the peak position of the measured radial runout to a position of a rim at which rim width is minimum;

corresponding the position of the tire which corresponds to the bottom position of the measured radial runout to another position of the rim at which rim width is maximum; and controlling elongation of ply cords by the aforementioned position-corresponding steps, thereby changing uniformity characteristics of the tire.

10. A tire configuration control method which controls the configuration of a tire after vulcanization, comprising the steps of:

restraining at least a portion of the area which extends from the side surfaces to the circumferential surface of a tire whose internal portion is in a high temperature state after vulcanization;

supplying a predetermined pressure into the tire, said predetermined pressure being set to a normal inner pressure of the tire or a normal inner pressure in PCI of the tire; and effecting a post cure inflation in a state in which the tire is restrained wherein the position of said tire which corresponds to the peak position of the measured radial runout is restrained and the position of said tire which corresponds to the bottom position of the measured radial runout is not restrained.

* * * * *